United States Patent
Fujimoto et al.

(10) Patent No.: US 10,935,949 B2
(45) Date of Patent: Mar. 2, 2021

(54) CONTROLLER SYSTEM

(71) Applicant: Mitsubishi Electric Corporation, Chiyoda-ku (JP)

(72) Inventors: Kenta Fujimoto, Tokyo (JP); Shigeki Nankaku, Osaka (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 61 days.

(21) Appl. No.: 16/094,612

(22) PCT Filed: Jan. 26, 2017

(86) PCT No.: PCT/JP2017/002707
§ 371 (c)(1),
(2) Date: Oct. 18, 2018

(87) PCT Pub. No.: WO2017/199469
PCT Pub. Date: Nov. 23, 2017

(65) Prior Publication Data
US 2019/0129370 A1    May 2, 2019

(30) Foreign Application Priority Data

May 17, 2016    (JP) .............................. JP2016-098938

(51) Int. Cl.
*G05B 19/042* (2006.01)
*G06F 9/48* (2006.01)
(Continued)

(52) U.S. Cl.
CPC ......... *G05B 19/0425* (2013.01); *G05B 15/02* (2013.01); *G05B 19/042* (2013.01);
(Continued)

(58) Field of Classification Search
CPC .. G05B 19/0425; G05B 19/042; G05B 15/02; G05B 2219/25054; G06F 9/48; G06F 13/4027
See application file for complete search history.

(56) References Cited

U.S. PATENT DOCUMENTS 5,911,083 A * 6/1999 Kuslak ...................... G06F 5/06
    712/41
7,139,618 B2 * 11/2006 Danz ..................... G05B 19/042
    700/23
(Continued)

FOREIGN PATENT DOCUMENTS

| JP | 63-49855 A | 3/1988 |
| JP | 3-97041 A | 4/1991 |
| JP | 9-146796 A | 6/1997 |

OTHER PUBLICATIONS

International Search Report dated May 9, 2017 in PCT/JP2017/002707, filed Jan. 26, 2017.
(Continued)

*Primary Examiner* — Henry Tsai
*Assistant Examiner* — John B Roche
(74) *Attorney, Agent, or Firm* — Xsensus LLP

(57) ABSTRACT

A controller system includes a controller, and a plurality of input/output control devices connected in series with the controller so as to allow communication therebetween. Each of the plurality of input/output control devices is configured to be connected with a sensor device. Each of the plurality of input/output control devices calculates a one-shot timer activation counter based on a total number of the sensor devices being objects to activate a one-shot timer out of the sensor devices that are connected with another input/output control device between a subject input/output control device and the controller.

10 Claims, 23 Drawing Sheets

(51) Int. Cl.
*G05B 15/02* (2006.01)
*G06F 13/40* (2006.01)

(52) U.S. Cl.
CPC ............ *G06F 9/48* (2013.01); *G06F 13/4027* (2013.01); *G05B 2219/25054* (2013.01)

(56) References Cited

U.S. PATENT DOCUMENTS

2010/0109866 A1* 5/2010 Gavrila .................. G08B 25/08
340/540
2013/0159580 A1* 6/2013 Dong .................. G06F 9/45558
710/266
2017/0277213 A1* 9/2017 Izumihara ................ F24F 11/89

OTHER PUBLICATIONS

Office Action dated Aug. 27, 2020 in Chinese Patent Application No. 201780029386.0, 17 pages.

* cited by examiner

F I G . 6
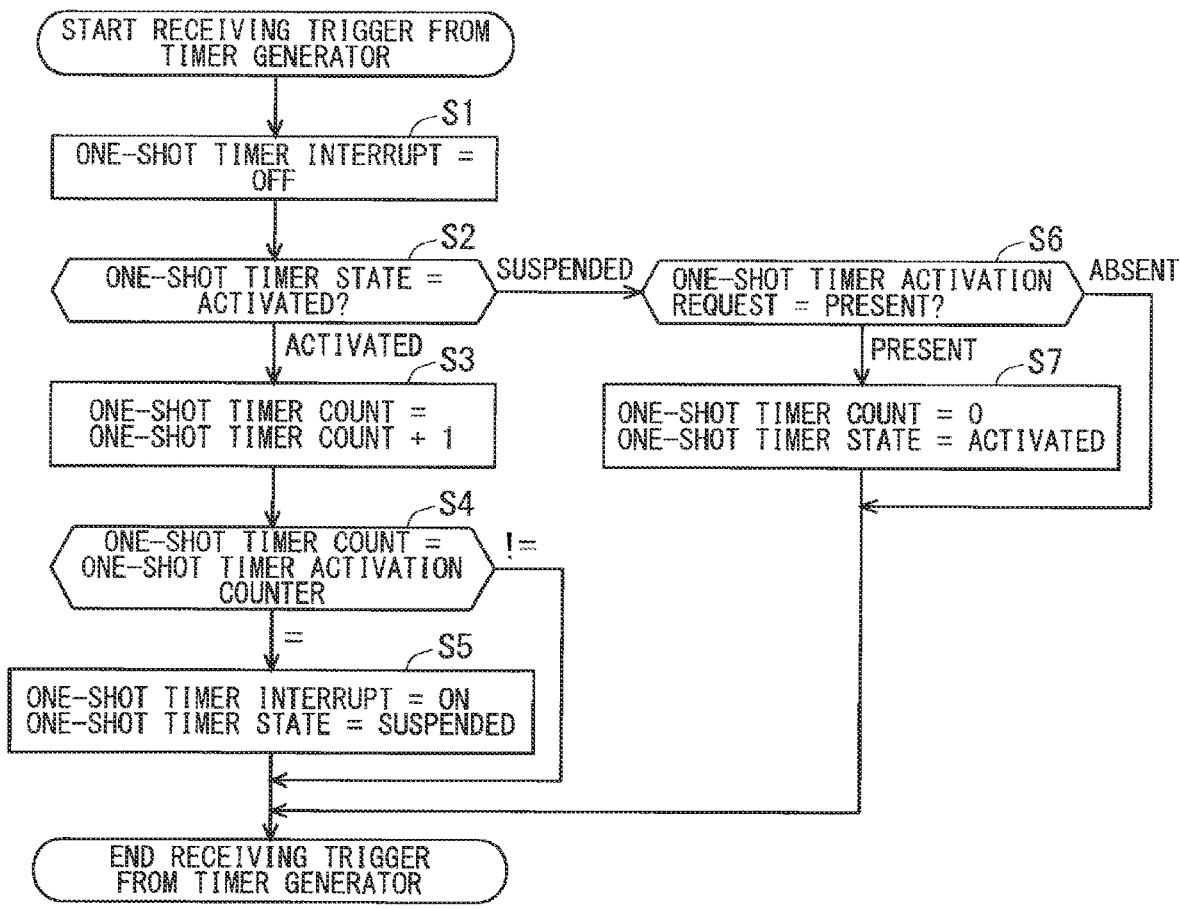

| 21 | ONE-SHOT TIMER ACTIVATION COUNTER | n1 |
| --- | --- | --- |
| 22 | CONNECTED-SENSOR NUMBER | y |
| 23 | SPECIFIED ACTIVATION INTERVAL COUNTER | n2 |
| 24 | CONNECTED-SENSOR TOTAL NUMBER | z |

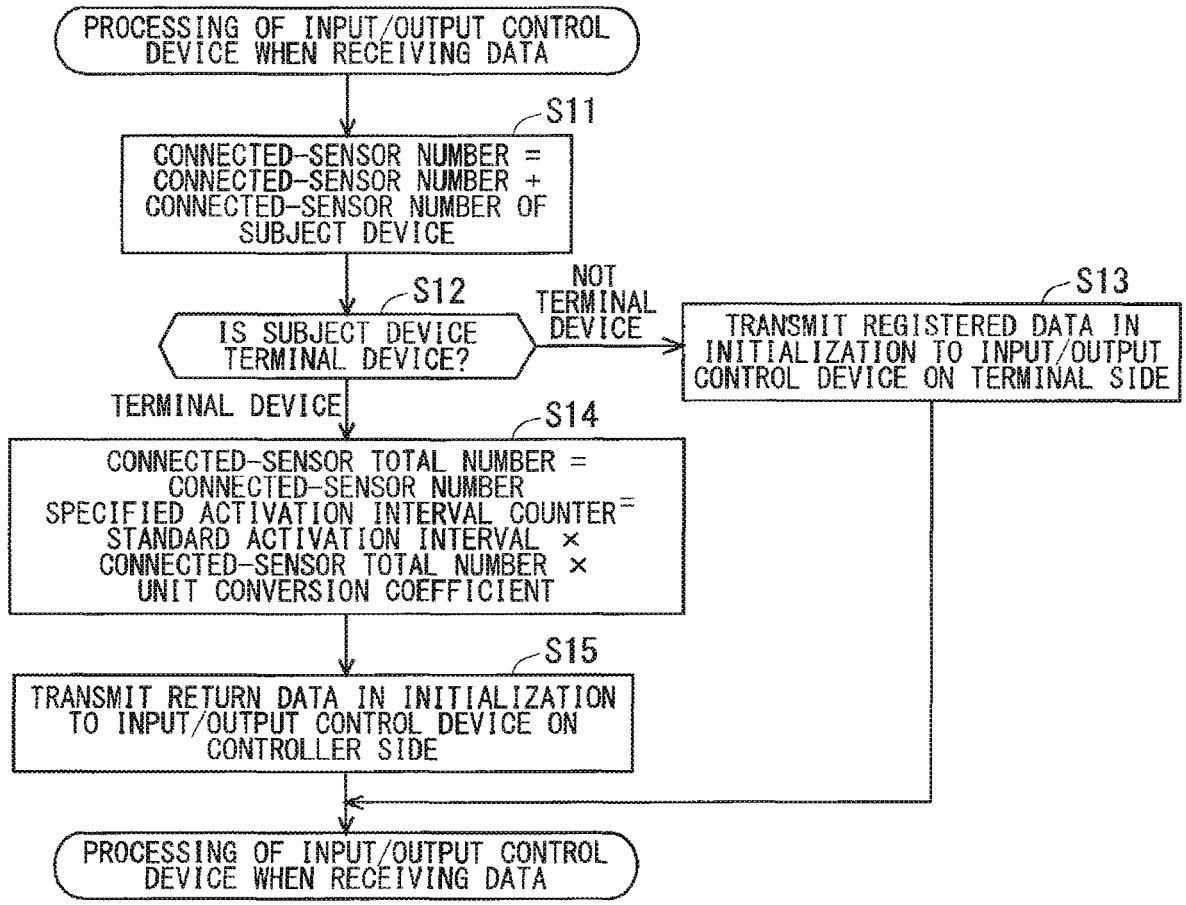

| TIMER NUMBER | ACTIVATION INTERVAL TIMER COUNT | RESET TRIGGER | SPECIFIED ACTIVATION INTERVAL COUNTER | ACTIVATION REQUEST NUMBER |
|---|---|---|---|---|
| 0 | 12000000 | 5 | 24000000 | 4 |
| 1 | 100000 | 6 | | |

FIG. 21

| | | |
|---|---|---|
| 21 | ONE-SHOT TIMER ACTIVATION COUNTER | n1 |
| 22 | CONNECTED-SENSOR NUMBER | y |
| 23 | SPECIFIED ACTIVATION INTERVAL COUNTER | n2 |
| 24 | CONNECTED-SENSOR TOTAL NUMBER | z |
| 25 | ACTIVATION INTERVAL NUMBER | m:TIMES |
| 26 | OPERATION MODE | 1:OVERLAPPING MODE<br>0:NORMAL MODE |
| 27 | TIMER ENABLE | 1:PERMISSION<br>0:PROHIBITION |

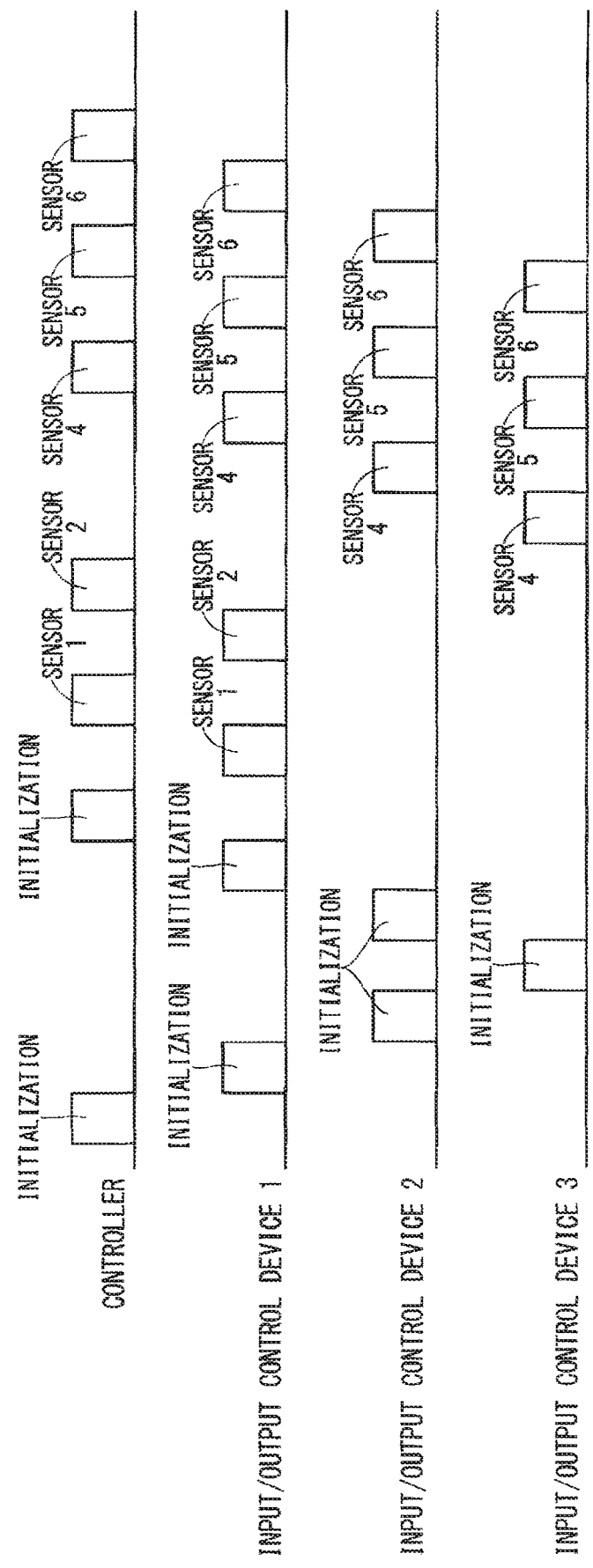

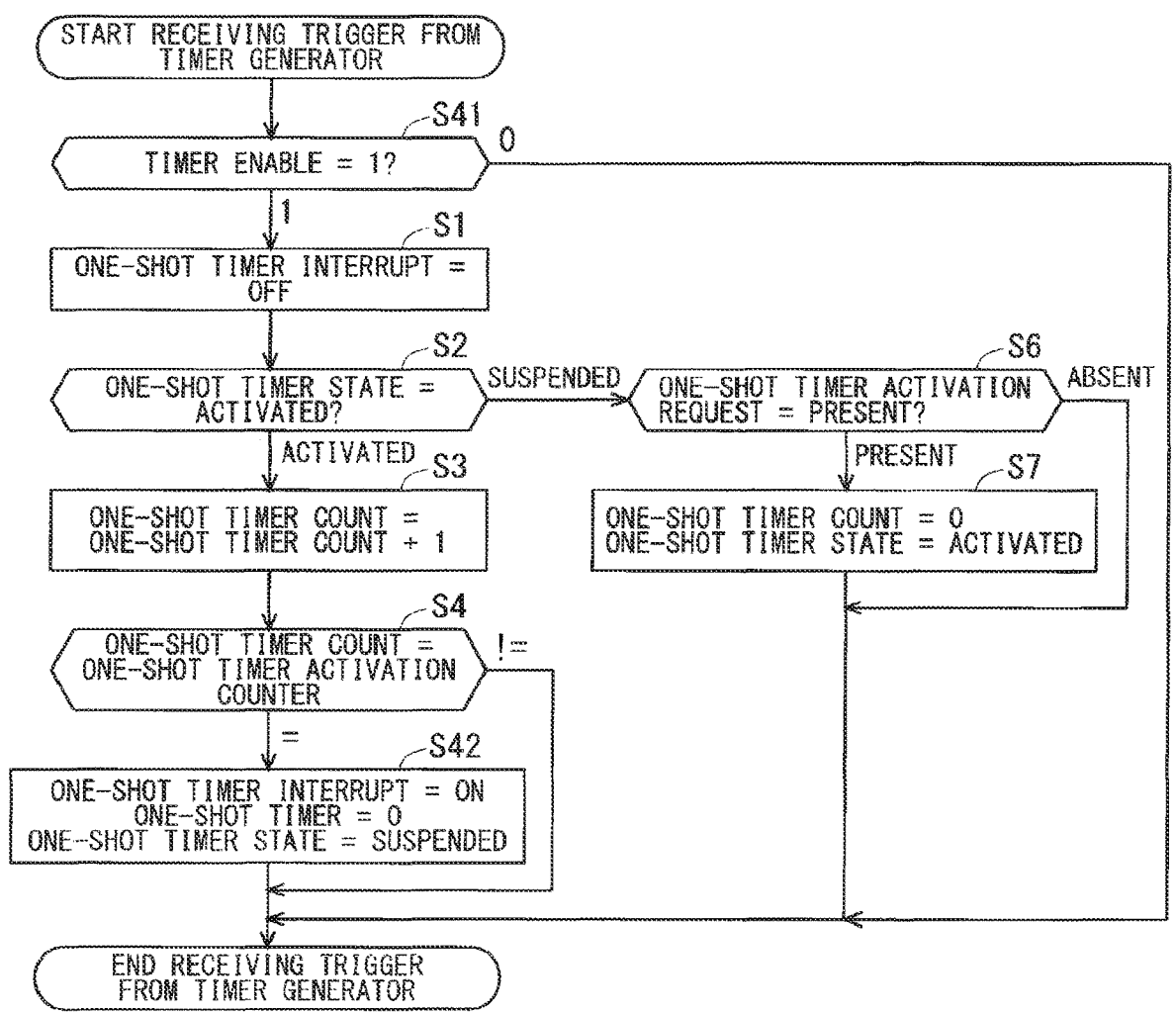
F I G . 2 4

FIG. 26

| | | |
|---|---|---|
| 21 | ONE-SHOT TIMER ACTIVATION COUNTER | n1 |
| 22 | CONNECTED-SENSOR NUMBER | y |
| 23 | SPECIFIED ACTIVATION INTERVAL COUNTER | n2 |
| 24 | CONNECTED-SENSOR TOTAL NUMBER | z |
| 25 | ACTIVATION INTERVAL NUMBER | m : TIMES |
| 26 | OPERATION MODE | 1 : OVERLAPPING MODE<br>0 : NORMAL MODE |
| 27 | TIMER ENABLE | 1 : PERMISSION<br>0 : PROHIBITION |
| 28 | ACTIVATION INTERVAL ENABLE | 1 : PERMISSION<br>0 : PROHIBITION |

CONTROLLER SYSTEM

TECHNICAL FIELD

The present invention relates to a controller system that includes a controller and a plurality input/output control devices each being able to be connected with a sensor device.

BACKGROUND ART

Hitherto, a periodic interrupt generation circuit outputs periodic interrupt signals of hardware to a processor in a certain cycle. A control program in the processor adds or subtracts a timer in the control program through timer processing of a timer interrupt routine activated by the periodic interrupt signals, and then activates predetermined control based on the added value or the subtracted value. Further, the control program in the processor monitors counter addition or subtraction and suspension due to malfunction in the hardware periodic interrupt generation circuit, and detects failure based on the monitored result. Such a technology is disclosed in Patent Document 1, for example.

Further, in a system including a central processing unit (CPU) and an interrupt signal generation circuit that generates periodic interrupt signals for the CPU, the count of clock pulses is reset based on the interrupt signals generated from the interrupt signal generation circuit. Then, the interrupt signals are output to the CPU and it is determined whether a value before the reset of the counter is a normal value or an abnormal value when an unreset count value reaches a specific value, thereby detecting anomaly in the interrupt generation circuit. Such a technology is disclosed in Patent Document 2, for example.

Further, in an interrupt signal monitoring circuit including an interrupt circuit that outputs interrupt signals to a CPU, the number of times of generation of interrupt signals generated within a monitored time set by a clocking means is counted, and the CPU is informed of interrupt signal anomaly when the counted value is equal to or more than a predetermined value. Such a technology is disclosed in Patent Document 3, for example.

PRIOR ART DOCUMENTS

Patent Documents

Patent Document 1: Japanese Patent Application Laid-Open No. 9-146796 (1997)
Patent Document 2: Japanese Patent Application Laid-Open No. 63-049855 (1988)
Patent Document 3: Japanese Patent Application Laid-Open No. 3-097041 (1991)

SUMMARY

Problem to be Solved by the Invention

In the above-mentioned technology, interrupts are generated in a CPU in a certain cycle, thereby increasing or decreasing a counter in a program activated by the interrupts and also determining whether the number of times of generation of the interrupts is normal or abnormal. However, in such a configuration, at the time when the interrupts of a certain cycle are managed, a time event queue managed by an operating system (OS) is required to be searched for, and timer interval calculation and anomaly reporting processing are required to be activated at a specific timing. Therefore, queue search, which is performed per certain cycle for activation detection and time-out detection, is required, which may raise a problem in that a load on a CPU, and also a load on a controller including a CPU, may be increased.

Therefore, the present invention has been made in view of the problems as above, and has an object to provide a technology capable of reducing a load on a controller.

Means to Solve the Problem

A controller system according to the present invention includes a controller, and a plurality of input/output control devices connected in series with the controller so as to allow communication therebetween. Each of the plurality of input/output control devices is able to be connected with a sensor device. Each of the plurality of input/output control devices includes a one-shot timer that regularly increments or decrements a one-shot timer count, and a one-shot timer interrupt generator that generates a one-shot timer interrupt based on the one-shot timer count and a one-shot timer activation counter. Each of the plurality of input/output control devices includes an activation counter calculator that calculates the one-shot timer activation counter based on a total number of the sensor devices being objects to activate the one-shot timer out of the sensor devices that are connected with another input/output control device between a subject input/output control device and the controller.

Effects of the Invention

According to the present invention, each of the plurality of input/output control devices calculates the one-shot timer activation counter based on a total number of the sensor devices being objects to activate the one-shot timer out of the sensor devices that are connected with another input/output control device between the subject input/output control device and the controller. With this, a load on the controller can be reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 6 is a flowchart illustrating processing of the input/output control device according to the first embodiment.

FIG. 10 is a flowchart illustrating processing of the input/output control device according to the second embodiment.

FIG. 11 is a diagram illustrating parameters stored in the one-shot timer control register according to a third embodiment.

FIG. 21 is a diagram illustrating parameters stored in the one-shot timer control register according to the fifth embodiment.

FIG. 23 is a timing chart for illustrating processing of the controller system according to the fifth embodiment.

FIG. 24 is a flowchart illustrating processing of the input/output control device according to the fifth embodiment.

FIG. 26 is a diagram illustrating parameters stored in the one-shot timer control register according to a sixth embodiment.

DESCRIPTION OF EMBODIMENTS

First Embodiment

Figure 1:
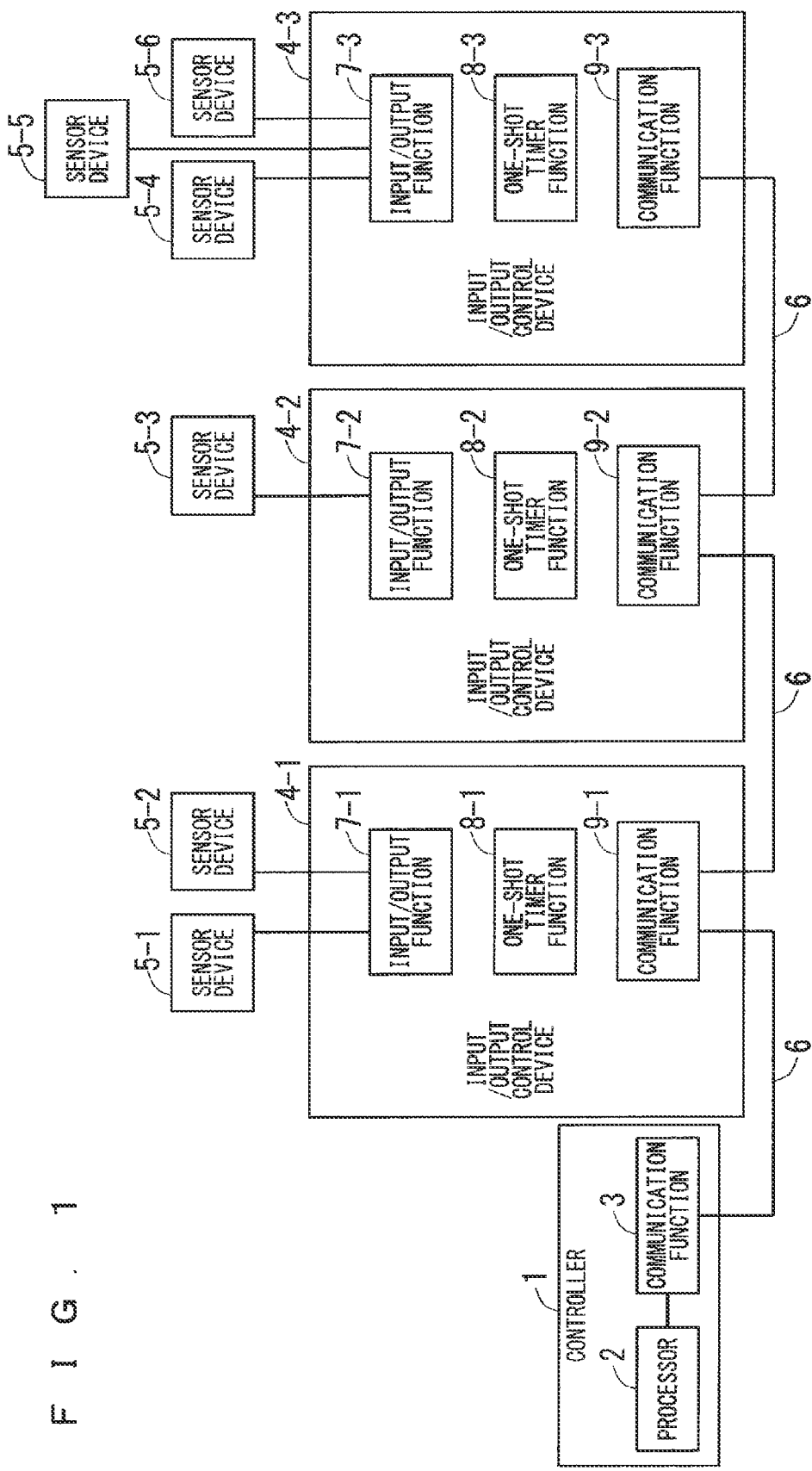
FIG. 1 is a block diagram illustrating an overall configuration of a controller system according to a first embodiment.

FIG. 1 is a block diagram illustrating an overall configuration of a controller system according to a first embodiment of the present invention. Note that, an overall configuration of a controller system according to other embodiments described later is similar to the overall configuration of the controller system of FIG. 1.

The controller system of FIG. 1 includes a controller 1, and input/output control devices 4-1, 4-2, and 4-3. In the description below, each of the input/output control devices may also be simply referred to as an "input/output control device 4," if not specified among the input/output control device 4-1 to the input/output control device 4-3. Note that, the plurality of input/output control devices according to the present invention are not limited the three input/output control devices 4, and may be two or more input/output control devices except the three input/output control devices.

The controller 1 includes a processor 2 and a communication function 3. The processor 2 includes a CPU and the like, for example. The communication function 3 can communicate with the input/output control device 4, and herein communicates with the input/output control device 4-1.

The controller 1 is connected with the input/output control device 4-1 so as to allow communication therebetween via a communication bus 6. Further, the input/output control device 4-1 is connected with the input/output control device 4-2 so as to allow communication therebetween via the communication bus 6, and the input/output control device 4-2 is connected with the input/output control device 4-3 so as to allow communication therebetween via the communication bus 6. In this manner, the plurality of input/output control devices 4 are connected in series with the controller 1 so as to allow communication therebetween.

In the example of FIG. 1, the input/output control device 4-1 is connected with sensor devices 5-1 and 5-2, the input/output control device 4-2 is connected with a sensor device 5-3, and the input/output control device 4-3 is connected with sensor devices 5-4, 5-5, and 5-6. In the description below, each of the sensor devices may also be simply referred to as a "sensor device 5," if not specified among the sensor devices 5-1 to 5-6. Note that, the sensor devices according to the present invention are not limited to the six sensor devices 5, and may be one or more sensor devices except the six sensor devices.

The sensor device 5 inputs and outputs sensor data to and from the outside of the sensor device 5. As in the above description, the input/output control device 4 can be connected with the sensor device 5, and thereby inputs and outputs sensor data to and from the connected sensor device 5.

The input/output control device 4-1 includes an input/output function 7-1, a one-shot timer function 8-1, and a communication function 9-1. Similarly, the input/output control device 4-2 includes an input/output function 7-2, a one-shot timer function 8-2, and a communication function 9-2, and the input/output control device 4-3 includes an input/output function 7-3, a one-shot timer function 8-3, and a communication function 9-3.

Note that, in the description below, each of the input/output functions may also be simply referred to as an "input/output function 7," if not specified among the input/output functions 7-1 to 7-3. Each of the one-shot timer functions may also be simply referred to as a "one-shot timer function 8," if not specified among the one-shot timer functions 8-1 to 8-3. Each of the communication functions may also be simply referred to as a "communication function 9," if not specified among the communication functions 9-1 to 9-3.

The input/output function 7 inputs and outputs data, such as sensor data, to and from the sensor device 5. The one-shot timer function 8 generates an interrupt when a counter counted from the acquisition of an activation request of a one-shot timer 12 from the controller 1 is equal to a one-shot timer activation counter to be described later. The communication function 9 transmits and receives data, such as sensor data, to and from the controller 1 and one input/output control device 4, or two input/output control devices 4, for example.

Here, the one-shot timer 12 is a circuit that outputs a pulse signal of a certain time only once after setting an activation time and being activated. Further, the counter is a register used in software or hardware. Through the full text of this specification, the counter is a value calculated by counting time based on the frequency of each device. Further, through the full text of this specification, a value or time compared in software or hardware is used to define an interval or time.

Figures 2, 3:
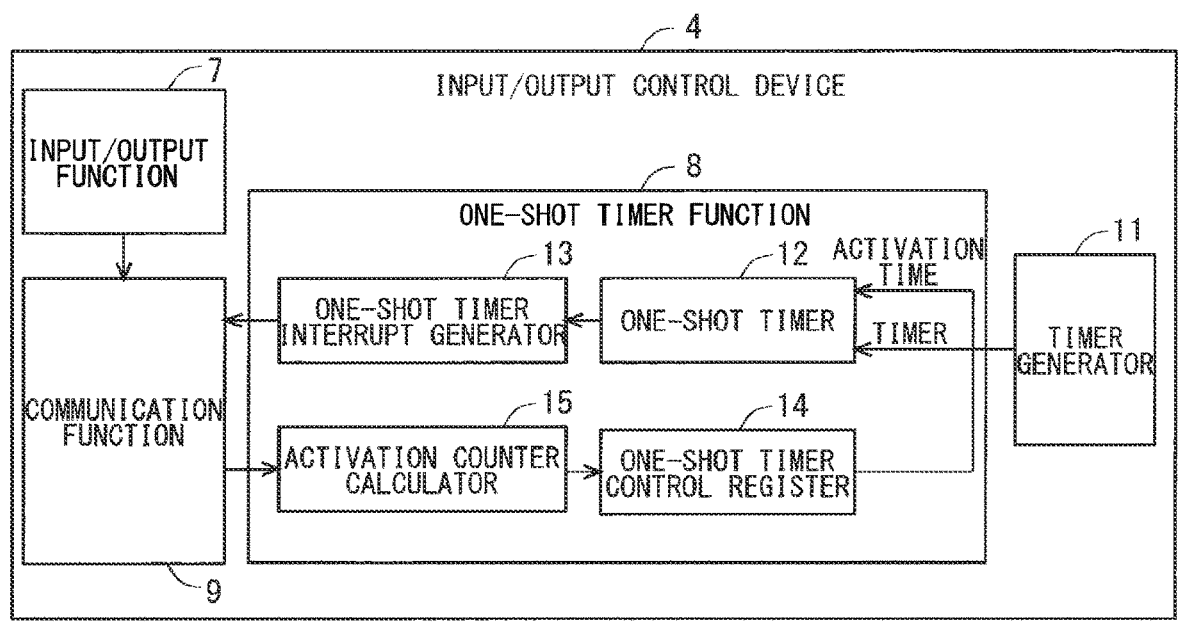
FIG. 2 is a block diagram illustrating a configuration of an input/output control device according to the first embodiment.
FIG. 3 is a diagram illustrating parameters stored in a one-shot timer control register according to the first embodiment.

FIG. 2 is a block diagram illustrating a configuration of the input/output control device 4 according to the first embodiment. Note that, in the description below, one input/output control device 4 that is focused among the plurality of input/output control devices 4 may also be referred to as a "subject device."

The one-shot timer function 8 of FIG. 2 includes a timer generator 11, a one-shot timer 12, a one-shot timer interrupt generator 13, a one-shot timer control register 14, and an activation counter calculator 15.

The timer generator 11 has a common timer generation frequency in the input/output control devices, and generates a trigger that regularly increments the count. When activated, the one-shot timer 12 regularly increments the one-shot timer count based on the trigger from the timer generator 11. The one-shot timer interrupt generator 13 generates a one-shot timer interrupt when the one-shot timer count is equal to a timer activation counter. The one-shot timer control register 14 stores parameters that control the operation of the input/output control device 4. The activation counter calculator 15 calculates the one-shot timer activation counter based on a total number of the sensor devices 5 being objects to activate the one-shot timer 12 out of the sensor devices 5 that are connected with other input/output control devices 4 between the subject device and the controller 1, and also based on a unit conversion coefficient obtained by converting a one-shot timer activation time in accordance with the timer generation frequency. The calculation result of the activation counter calculator 15 is stored in the one-shot timer control register 14.

Here, a one-shot timer counter is a register indicating the number of effective clock signals after the activation of the one-shot timer. Further, the timer activation counter is a register that is compared with the one-shot timer counter, and outputs a pulse signal when both of the counters are equal to each other. Further, the one-shot timer activation time indicates a common interval and time that are independent of the frequency of the device. Further, the one-shot timer activation counter is a register that stores a value obtained by calculating time into a counter based on the frequency of the device.

FIG. 3 is a diagram illustrating parameters stored in the one-shot timer control register 14 according to the first embodiment. The one-shot timer control register 14 stores, as its parameters, a timer activation counter 21 and a connected-sensor number 22.

The timer activation counter 21 is a counter that is compared with the one-shot timer count of the one-shot timer 12 in order to determine whether or not a one-shot timer interrupt is to be generated. The connected-sensor number 22 is a total number of the sensor devices 5 being objects to activate the one-shot timer 12 out of the sensor devices 5 that are connected with other input/output control devices 4 between the subject device and the controller 1.

Figure 4:
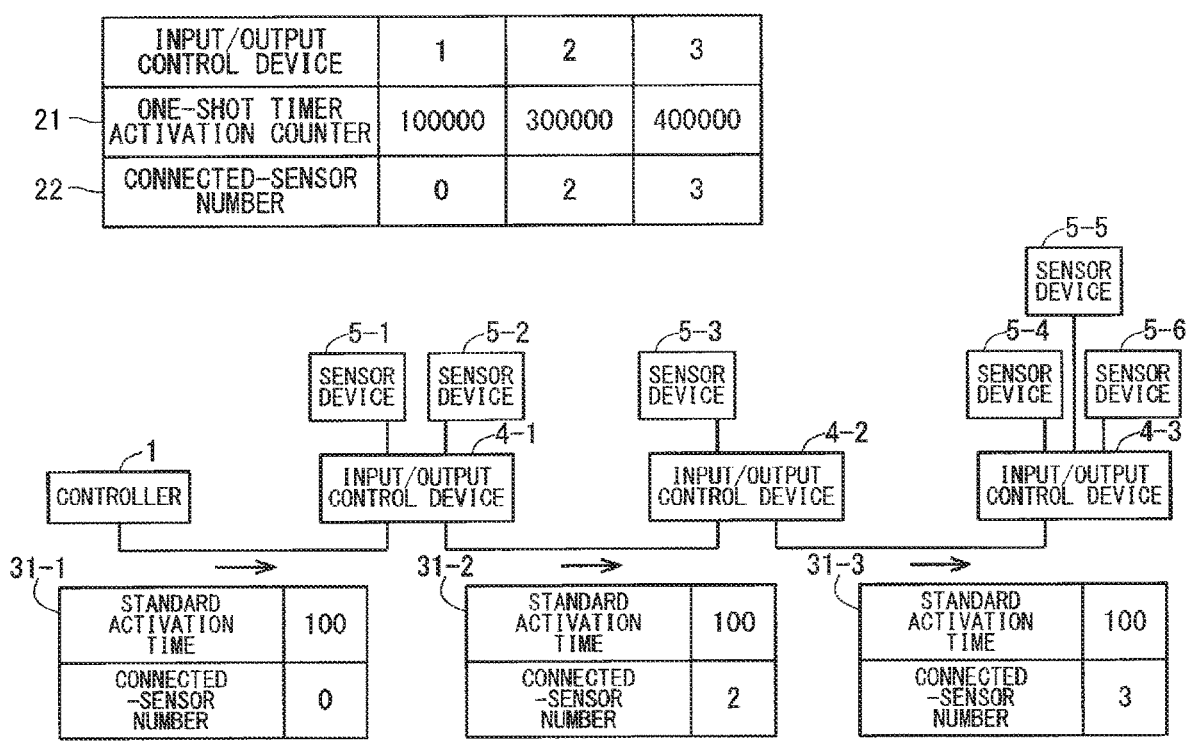
FIG. 4 is a diagram for illustrating processing of the controller system according to the first embodiment.

FIG. 4 is a block diagram for illustrating processing of the controller system according to the first embodiment. Note that, the calculation of the one-shot timer activation counter described below is performed by the activation counter calculator 15 in each of the input/output control devices 4-1 to 4-3, for example.

The controller 1 transmits, to the input/output control device 4-1, registered data in initialization 31-1 being data for specifying the parameters of the one-shot timer control register 14. The registered data in initialization 31-1 according to the first embodiment contains standard activation time being predetermined time for activating a single one-shot timer 12, and the connected-sensor number. In the example of FIG. 4, the standard activation time of the registered data in initialization 31-1 is "100," and the connected-sensor number of the registered data in initialization 31-1 is a default value of "0."

The input/output control device 4-1 calculates the one-shot timer activation counter based on the connected-sensor number. In the first embodiment, the input/output control device 4-1 calculates a value obtained by standard activation time+standard activation time×connected-sensor number as the one-shot timer activation counter, and then stores the calculated one-shot timer activation counter and the received connected-sensor number in the one-shot timer control register 14. In the example of FIG. 4, the one-shot timer activation time is defined in millisecond, and the timer is counted up for every microsecond when the timer generation frequency is 1 MHz. Thus, the one-shot timer activation counter of the input/output control device 4-1 is "100000 (=(100+100×0)×1000)."

The input/output control device 4-1 transmits, to the input/output control device 4-2, registered data in initialization 31-2 similar to the registered data in initialization 31-1. The standard activation time of the registered data in initialization 31-2 is "100." The connected-sensor number of the registered data in initialization 31-2 is "2," which is obtained by adding "2" of the sensor devices 5-1 and 5-2 connected with the input/output control device 4-1 to "0" of the connected-sensor number of the registered data in initialization 31-1.

The input/output control device 4-2 calculates the one-shot timer activation counter based on the connected-sensor number. In the first embodiment, similarly to the calculation of the one-shot timer activation counter performed by the input/output control device 4-1, the input/output control device 4-2 calculates the one-shot timer activation counter, and then stores the calculated one-shot timer activation counter and the received connected-sensor number in the one-shot timer control register 14. In the example of FIG. 4, the one-shot timer activation counter of the input/output control device 4-2 is "300000 (=(100+100×2)×1000)."

The input/output control device 4-2 transmits, to the input/output control device 4-3, registered data in initialization 31-3 similar to the registered data in initialization 31-1. The standard activation time of the registered data in initialization 31-3 is "100." The connected-sensor number of the registered data in initialization 31-3 is "3," which is obtained by adding "1" of the sensor device 5-3 connected with the input/output control device 4-2 to "2" of the connected-sensor number of the registered data in initialization 31-2.

The input/output control device 4-3 calculates the one-shot timer activation counter based on the connected-sensor number. In the first embodiment, similarly to the calculation of the one-shot timer activation counter performed by the input/output control device 4-1, the input/output control device 4-3 calculates the one-shot timer activation counter, and then stores the calculated one-shot timer activation counter and the received connected-sensor number in the one-shot timer control register 14. In the example of FIG. 4, the one-shot timer activation counter of the input/output control device 4-3 is "400000 (=(100+100×3)×1000)."

Note that, in the description below, each of the pieces of the registered data in initialization may also be simply referred to as "registered data in initialization 31," if not specified among the pieces of the registered data in initialization 31-1 to 31-3.

Figure 5:
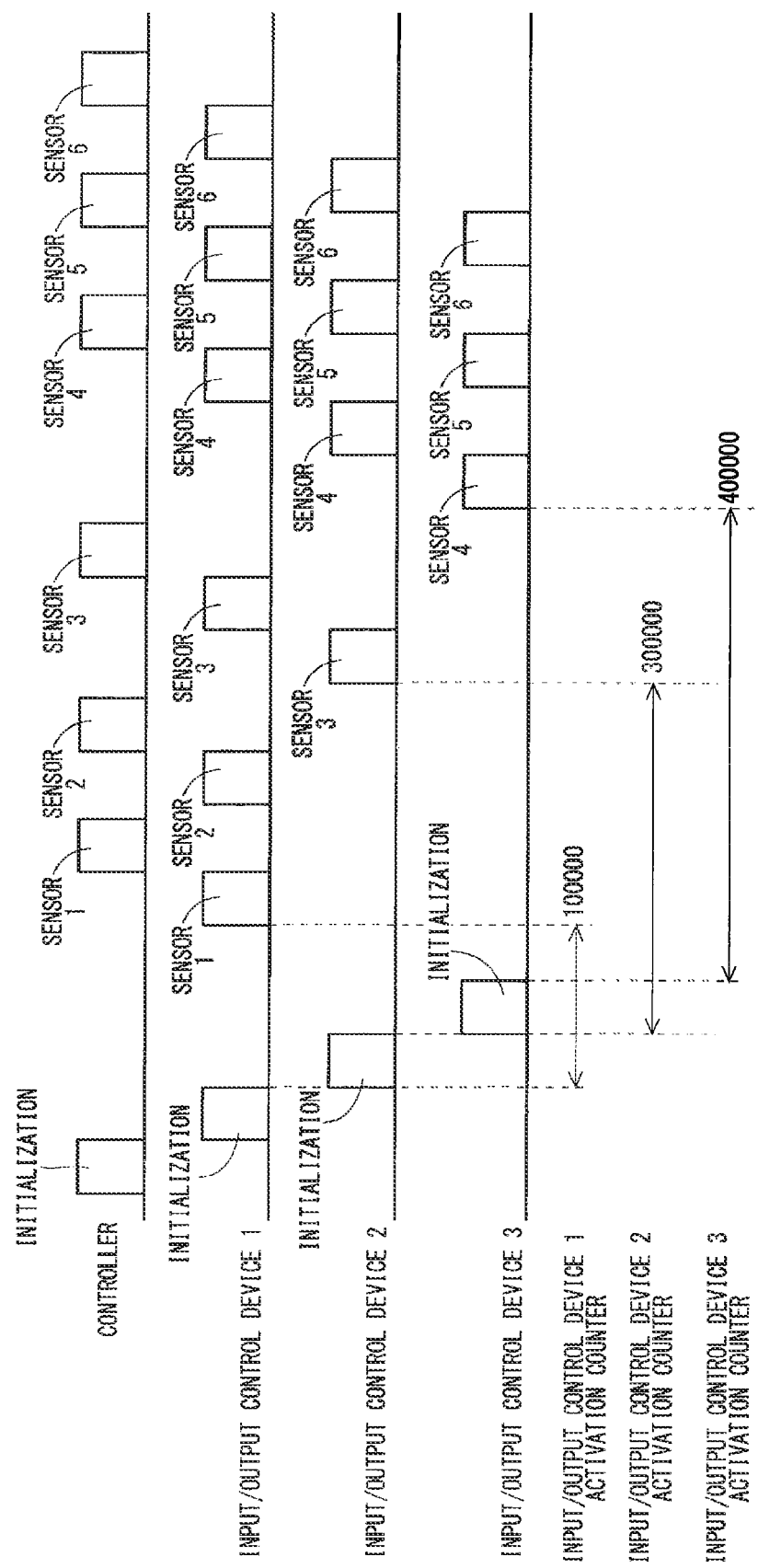
FIG. 5 is a timing chart for illustrating processing of the controller system according to the first embodiment.

FIG. 5 is a timing chart illustrating the timing of transmitting sensor data to the controller 1 through a one-shot timer interrupt in the controller system according to the first embodiment.

Note that, the input/output control devices 1, 2, and 3 of FIG. 5 respectively correspond to the input/output control devices 4-1, 4-2, and 4-3 of FIG. 1, and the input/output control device 1 activation counter and so on of FIG. 5 respectively correspond to the one-shot timer activation counter of the input/output control device 4-1 and so on. Further, the initializations of FIG. 5 respectively correspond to the pieces of the registered data in initialization 31 illustrated in FIG. 4, and the sensors 1, 2, 3, 4, 5, and 6 of FIG. 5 respectively correspond to pieces of sensor data of the sensor devices 5-1, 5-2, 5-3, 5-4, 5-5, and 5-6 of FIG. 1. Such expression is similarly used in the timing charts below.

Incidentally, as illustrated in FIG. 4, the registered data in initialization 31 from the controller 1 is sequentially transmitted to the input/output control devices 4-1, 4-2, and 4-3, thereby sequentially setting the one-shot timer activation counter in the one-shot timer control registers 14 of the input/output control devices 4-1, 4-2, and 4-3.

When the one-shot timer activation counter of the input/output control device 4-1 is set, the one-shot timer 12 of the input/output control device 4-1 is activated. Then, when the one-shot timer count equals the one-shot timer activation counter (in this example, "100000") of the input/output control device 4-1, the input/output control device 4-1 sequentially transmits the pieces of the sensor data of the connected sensor devices 5-1 and 5-2 to the controller 1.

Similarly, when the one-shot timer activation counter of the input/output control device 4-2 is set, the one-shot timer 12 of the input/output control device 4-2 is activated. Then, when the one-shot timer count equals the one-shot timer activation counter (in this example, "300000") of the input/output control device 4-2, the input/output control device 4-2 transmits the sensor data of the connected sensor device 5-3 to the controller 1 via the input/output control device 4-1.

Similarly, when the one-shot timer activation counter of the input/output control device 4-3 is set, the one-shot timer 12 of the input/output control device-4-3 is activated. Then, when the one-shot timer count equals the one-shot timer activation counter (in this example, "400000") of the input/output control device 4-3, the input/output control device 4-3 sequentially transmits the pieces of the sensor data of the connected sensor devices 5-4, 5-5, and 5-6 to the controller 1 via the input/output control devices 4-1 and 4-2.

FIG. 6 is a flowchart illustrating processing of generating a one-shot timer interrupt in the input/output control device 4 according to the first embodiment. The processing of this flowchart is executed when a trigger is generated in the timer generator 11, i.e., when a trigger is received.

First of all, in Step S1, the input/output control device 4 brings the one-shot timer interrupt into an off state.

In Step S2, the input/output control device 4 determines whether the one-shot timer 12 is activated at the present time point. When determination is made that the one-shot timer 12 is activated, the processing proceeds to Step S3, whereas when determination is made that the one-shot timer 12 is suspended, the processing proceeds to Step S6.

In Step S3, the one-shot timer 12 increments the one-shot timer count.

In Step S4, the one-shot timer interrupt generator 13 determines whether or not the one-shot timer count is equal to the one-shot timer activation counter. When determination is made that the one-shot timer count is equal to the one-shot timer activation counter, the processing proceeds to Step S5, whereas when determination is made that the one-shot timer count is not equal to the one-shot timer activation counter, the processing of FIG. 6 is ended.

In Step S5, the one-shot timer interrupt generator 13 brings the one-shot timer interrupt into an on state, and generates a one-shot timer interrupt. Further, the input/output control device 4 suspends the activation of the one-shot timer 12. After that, the processing of FIG. 6 is ended.

When the processing proceeds from Step S2 to Step S6, the input/output control device 4 determines whether or not to have acquired, from the controller 1, an activation request of the one-shot timer 12, such as the registered data in initialization 31. When determination is made that the input/output control device 4 has acquired an activation request of the one-shot timer 12, the processing proceeds to Step S7, whereas when determination is made that the input/output control device 4 has not acquired an activation request of the one-shot timer 12, the processing of FIG. 6 is ended.

In Step S7, the input/output control device 4 resets the one-shot timer count into 0, and activates the one-shot timer 12. After that, the processing of FIG. 6 is ended.

In the controller system according to the first embodiment as described above, each activation counter calculator 15 of the plurality of input/output control devices 4 calculates the one-shot timer activation counter based on the connected-sensor number. With such a configuration, the controller 1 can acquire data in a time-division manner even if, with a timer being provided in the controller 1, the controller 1 does not manage a time event queue, i.e., does not manage time for generating an interrupt. Therefore, a load on the controller 1 can be reduced. Further, enhancement in responsiveness of the controller system can be expected as well.

Note that, in the description above, the one-shot timer interrupt generator 13 generates a one-shot timer interrupt when the one-shot timer count is equal to the one-shot timer activation counter. However, this example is not restrictive, and the one-shot time interrupt generator 13 may generate a one-shot timer interrupt when the one-shot timer count is equal to or more than the one-shot timer activation counter.

Further, in the description above, the one-shot timer 12 regularly increments the one-shot timer count. However, this example is not restrictive, and the one-shot timer 12 may regularly decrement the one-shot timer count whose default value is set to be a comparatively large value. Then, the one-shot timer interrupt generator 13 may generate a one-shot timer interrupt when the difference between the default value and the one-shot timer count is equal to or more than the one-shot timer activation counter. That is, the one-shot timer interrupt generator 13 may be configured to generate a one-shot timer interrupt based on the one-shot timer count and the one-shot timer activation counter.

Second Embodiment

Figures 7, 8:
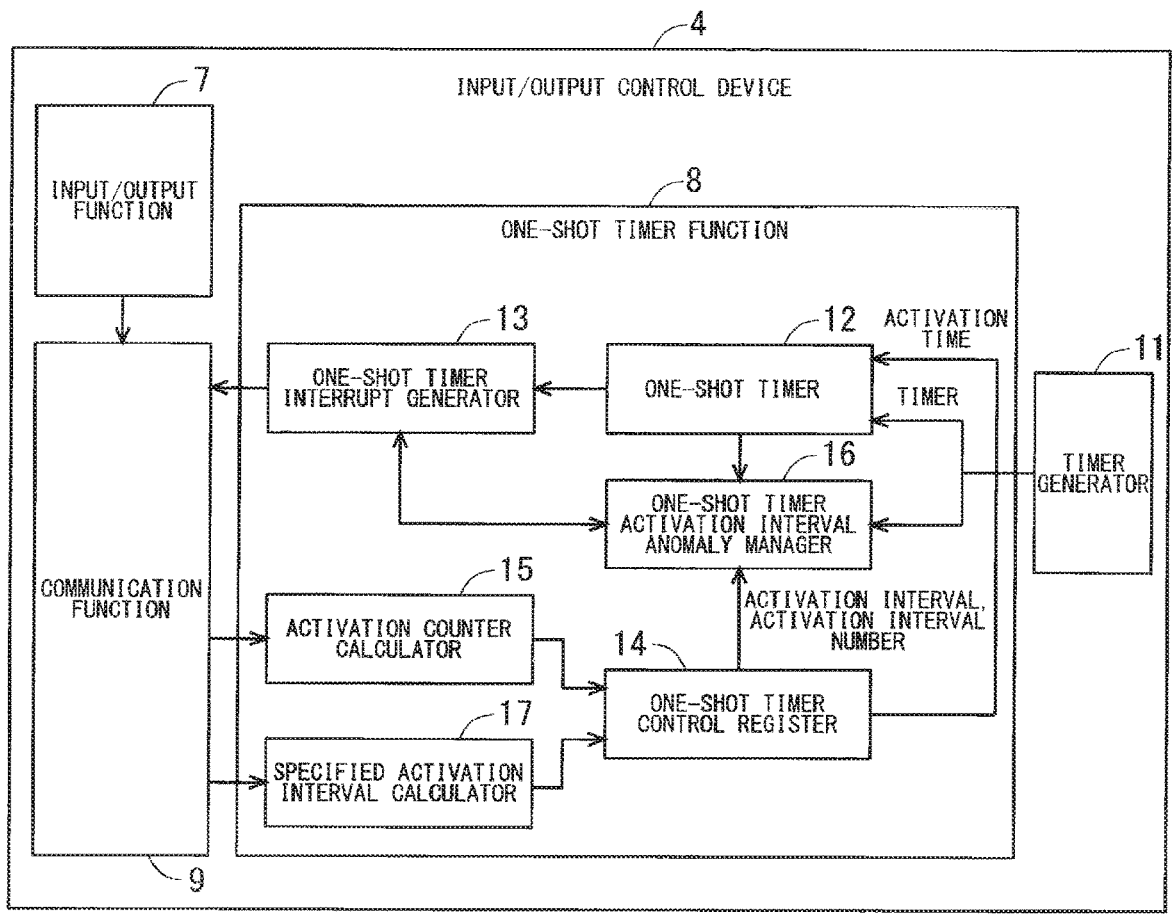
FIG. 7 is a block diagram illustrating a configuration of the input/output control device according to a second embodiment.
FIG. 8 is a diagram illustrating parameters stored in the one-shot timer control register according to the second embodiment.

FIG. 7 is a block diagram illustrating a configuration of the input/output control device according to a second embodiment of the present invention. In the description below, components described in the second embodiment that are the same as or similar to the components of the first embodiment are denoted by the same reference symbols, and different components are mainly described.

The one-shot timer function 8 of FIG. 7 includes a one-shot timer activation interval anomaly manager 16 and a specified activation interval calculator 17 along with the one-shot timer function 8 according to the first embodiment of FIG. 2.

The one-shot timer activation interval anomaly manager 16 according to the second embodiment detects whether or not an interval between time at which the one-shot timer 12 was last activated and time at which the one-shot timer 12 is next activated, i.e., an interval between activations of the one-shot timer 12, is equal to or more than a specified activation interval counter. Then, when the interval between activations of the one-shot timer 12 is equal to or more than the specified activation interval counter, the one-shot timer activation interval anomaly manager 16 informs the controller 1 about activation interval anomaly.

The specified activation interval calculator 17 calculates a specified activation interval counter based on a total number of the sensor devices 5 being objects to activate the one-shot timer 12 out of all of the sensor devices 5 that are connected with the plurality of input/output control devices 4. The calculation result of the specified activation interval calculator 17 is stored in the one-shot timer control register 14. Note that, the specified activation interval calculator 17 need not be provided in each of the plurality of input/output control devices 4. It is only necessary that the specified activation interval calculator 17 be provided in at least any one of the plurality of input/output control devices 4.

FIG. 8 is a diagram illustrating parameters stored in the one-shot timer control register 14 according to the second embodiment. The one-shot timer control register 14 according to the second embodiment stores a specified activation interval counter 23 and a connected-sensor total number 24 along with the parameters of FIG. 3.

The specified activation interval counter 23 is a counter specified in advance for determining whether or not an interval between activations of the one-shot timer 12 is abnormal. The connected-sensor total number 24 is a total number of the sensor devices being objects to activate the one-shot timer 12 out of all of the sensor devices 5-1 to 5-6 that are connected with the input/output control devices 4-1 to 4-3. That is, the connected-sensor total number 24 is a total number of the sensor devices being objects to activate the one-shot timer 12 out of all of the sensor devices 5 that are connected with the controller system.

Figure 9:
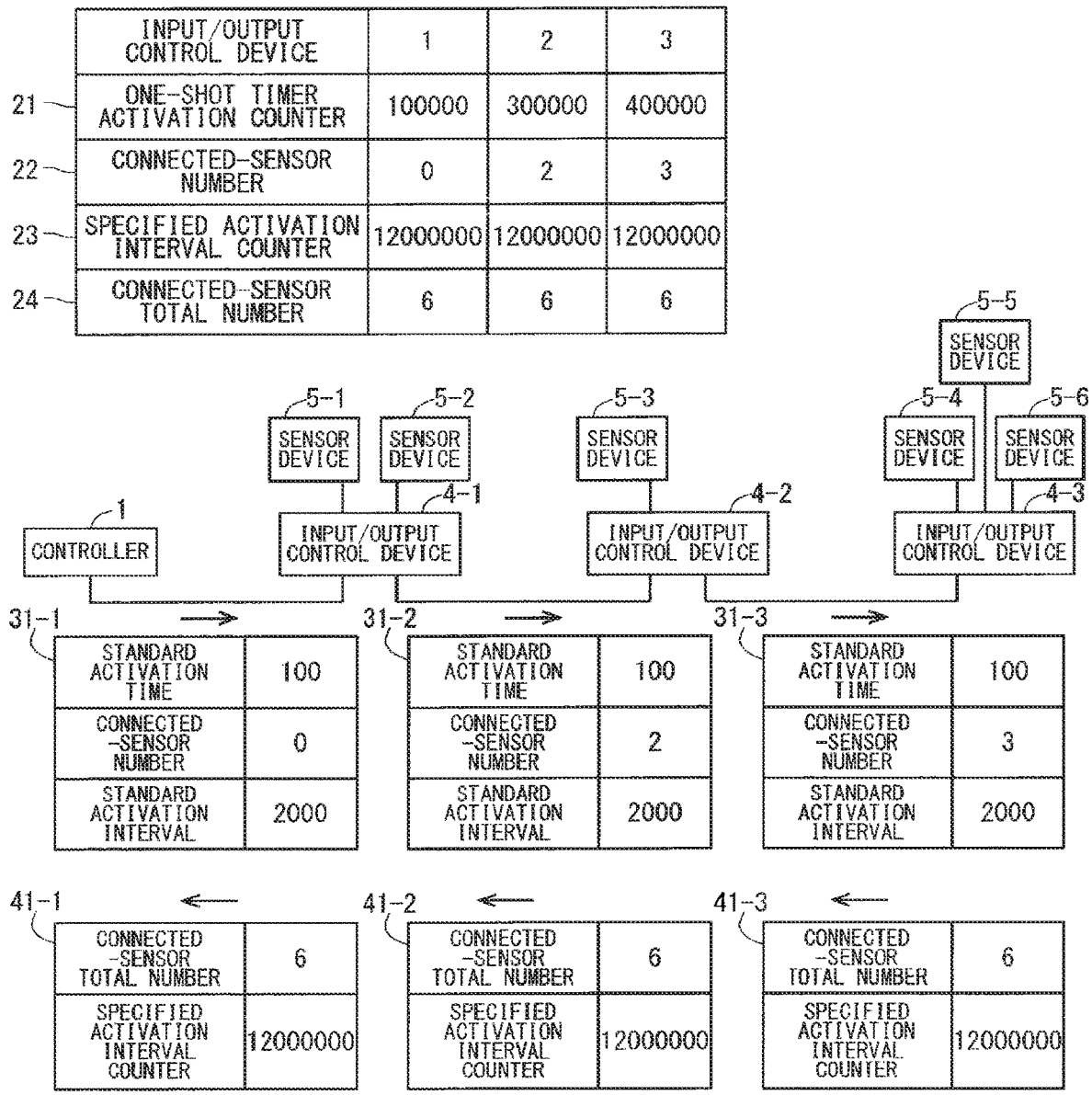
FIG. 9 is a diagram for illustrating processing of the controller system according to the second embodiment.

FIG. 9 is a diagram for illustrating processing of the controller system according to the second embodiment.

Similarly to the first embodiment, the controller 1 transmits the registered data in initialization 31-1 to the input/output control device 4-1. Note that, the registered data in initialization 31-1 according to the second embodiment contains a standard activation interval along with the registered data in initialization 31-1 according to the first embodiment of FIG. 4. Similarly, the pieces of the registered data in initialization 31-2 and 31-3 according to the second embodiment each further contain a standard activation interval. Note that, in the example of FIG. 9, the standard activation interval of the pieces of the registered data in initialization 31-1 to 31-3 is "2000."

The specified activation interval calculator 17 calculates a specified activation interval counter based on the connected-sensor total number. In the second embodiment, the specified activation interval calculator 17 is provided in the input/output control device 4-3, which is a terminal device in the line of the input/output control devices 4-1 to 4-3, and calculates a value obtained by standard activation interval× connected-sensor total number×unit conversion coefficient as the specified activation interval counter.

In the example of FIG. 9, the input/output control device 4-3 calculates "6" as the connected-sensor total number, which is obtained by adding "3" of the sensor devices 5-4, 5-5, and 5-6 connected with the input/output control device 4-3 to "3" of the connected-sensor number of the registered data in initialization 31-3. Then, the specified activation interval calculator 17 calculates "12000000 (=(2000×6) >1000)" as the specified activation interval counter.

The input/output control device 4-3 stores the calculated connected-sensor total number and specified activation interval counter in the one-shot timer control register 14 of the input/output control device 4-3. Further, the input/output control device 4-3 transmits return data in initialization 41-3 containing the connected-sensor total number and the specified activation interval counter to the input/output control device 4-2.

The input/output control device 4-2 stores the transmitted connected-sensor total number and specified activation interval counter in the one-shot timer control register 14 of the input/output control device 4-2. Further, the input/output control device 4-2 transmits return data in initialization 41-2 containing the connected-sensor total number and the specified activation interval counter to the input/output control device 4-1.

The input/output control device 4-1 stores the transmitted connected-sensor total number and specified activation interval counter in the one-shot timer control register 14 of the input/output control device 4-1. Further, the input/output control device 4-1 transmits return data in initialization 41-1 containing the connected-sensor total number and the specified activation interval counter to the controller 1.

Note that, in the description below, each of the pieces of the return data in initialization may also be simply referred to as "return data in initialization 41," if not specified among the pieces of the return data in initialization 41-1 to 41-3.

After that, when the one-shot timer count equals or exceeds the specified activation interval counter, the one-shot timer activation interval anomaly manager 16 of the input/output control device 4 informs the controller 1 about activation interval anomaly.

FIG. 10 is a flowchart illustrating processing of calculating the connected-sensor total number and the specified activation interval counter and so on in the input/output control device 4 according to the second embodiment.

First of all, in Step S11, when the input/output control device 4 receives the registered data in initialization 31 containing the standard activation time, the connected-sensor number, and the standard activation interval, the input/output control device 4 adds the number of the sensor devices 5 connected with the subject device to the received connected-sensor number, and stores the added value as the connected-sensor number of the subject device in the one-shot timer control register 14 of the subject device.

In Step S12, the input/output control device 4 determines whether or not the subject device is a terminal device in the line of the plurality of input/output control devices 4. When determination is made that the subject device is not a terminal device, the processing proceeds to Step S13, whereas when determination is made that the subject device is a terminal device, the processing proceeds to Step S14.

In Step S13, the input/output control device 4 transmits the registered data in initialization 31 containing the calculated connected-sensor number and the received standard activation time and standard activation interval to the input/output control device 4 on the terminal side. After that, the processing of FIG. 10 is ended.

When the processing proceeds from Step S12 to Step S14, the input/output control device 4, being a terminal device, stores the calculated connected-sensor number as the connected-sensor total number in the one-shot timer control register 14 of the subject device. Then, the specified activation interval calculator 17 multiplies the standard activation interval, the connected-sensor total number, and the unit conversion, coefficient, and stores the obtained result as the specified activation interval counter in the one-shot timer control register 14 of the subject device.

In Step S15, the input/output control device 4 transmits the return data in initialization 41 containing the connected-sensor total number and the specified activation interval counter to the input/output control device 4 on the controller 1 side or to the controller 1. After that, the processing of FIG. 10 is ended.

In the controller system according to the second embodiment as described above, the specified activation interval counter is calculated based on the connected-sensor total number. With such a configuration, even if the connected-sensor total number is increased or decreased, the specified activation interval counter can be changed appropriately. With this, activation interval anomaly can be detected appropriately.

Third Embodiment

The configuration of the input/output control device according to a third embodiment of the present invention is similar to the configuration of the input/output control device according to the second embodiment of FIG. 7. In the description below, components described in the third embodiment that are the same as or similar to the components of the second embodiment are denoted by the same reference symbols, and different components are mainly described.

The one-shot timer activation interval anomaly manager 16 according to the third embodiment detects whether or not a unit interval counter, whose unit is each interval between a predetermined plurality of times of activations of the one-shot timer 12, is equal to or more than a specified activation interval counter. Then, when the unit interval counter of the one-shot timer 12 is equal to or more than the specified activation interval counter, the one-shot timer activation interval anomaly manager 16 informs the controller 1 about activation, interval anomaly.

The specified activation interval calculator 17 calculates a specified activation interval counter based on a total number of the sensor devices 5 being objects to activate the one-shot timer 12 out of all of the sensor devices 5 that are connected with the plurality of input/output control devices 4, the unit conversion coefficient, and the above-mentioned plurality of times. Note that, the specified activation interval calculator 17 need not be provided in each of the plurality of input/output control devices 4. It is only necessary that the specified activation interval calculator 17 be provided in at least any one of the plurality of input/output control devices 4.

FIG. 11 is a diagram illustrating parameters stored in the one-shot timer control register 14 according to the third embodiment. The one-shot timer control register 14 according to the third embodiment stores an activation interval number 25 along with the parameters of FIG. 8. The activation interval number 25 indicates the above-mentioned plurality of times on the basis of the unit interval.

Figure 12:
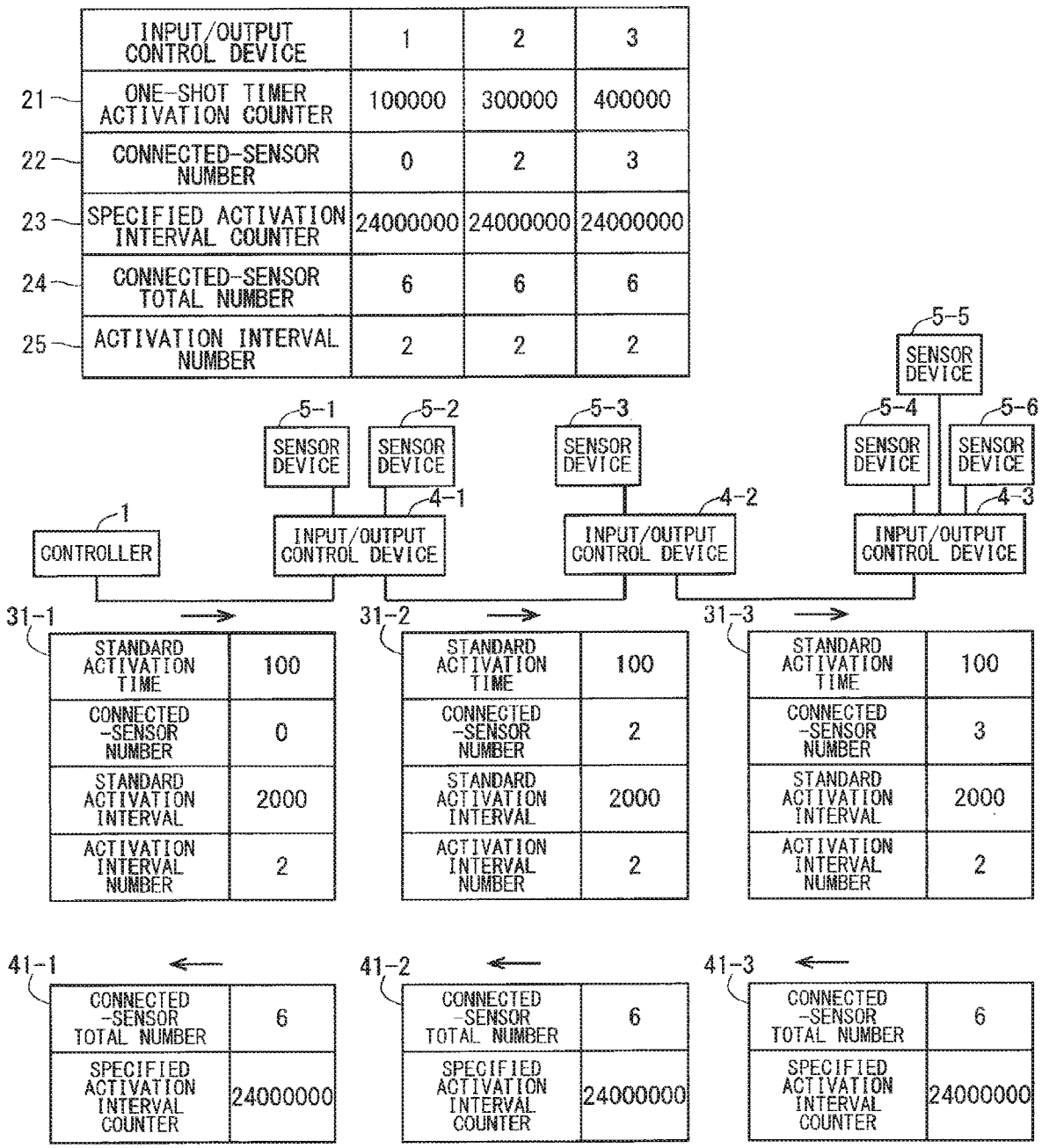
FIG. 12 is a diagram for illustrating processing of the controller system according to the third embodiment.

FIG. 12 is a diagram for illustrating processing of the controller system according to the third embodiment.

Similarly to the second embodiment, the controller 1 transmits the registered data in initialization 31-1 to the input/output control device 4-1. Note that, the registered data in initialization 31-1 according to the third embodiment contains an activation interval number along with the registered data in initialization 31-1 according to the second embodiment of FIG. 9. Similarly, the pieces of the registered data in initialization 31-2 and 31-3 according to the third embodiment each further contain an activation interval number. Note that, in the example of FIG. 12, the activation interval number of the pieces of the registered data in initialization 31-1 to 31-3 is "2."

The specified activation interval calculator 17 calculates a specified activation interval counter based on the connected-sensor total number and the activation interval number. In the third embodiment, the specified activation interval calculator 17 is provided in the input/output control device 4-3 being a terminal device, and calculates a value obtained by standard activation interval×connected-sensor total number×activation interval number×unit conversion coefficient as the specified activation interval counter. In the example of FIG. 9, the specified activation interval calculator 17 calculates "24000000 (2000×6×2)×1000" as the specified activation interval counter.

The input/output control device 4 stores the connected-sensor total number and the specified activation interval counter in the one-shot timer control register 14 of the subject device. Then, the input/output control device 4 transmits the return data in initialization 41 containing the connected-sensor total number and the specified activation interval counter to the input/output control device 4 on the controller 1 side or to the controller 1.

Figure 13:
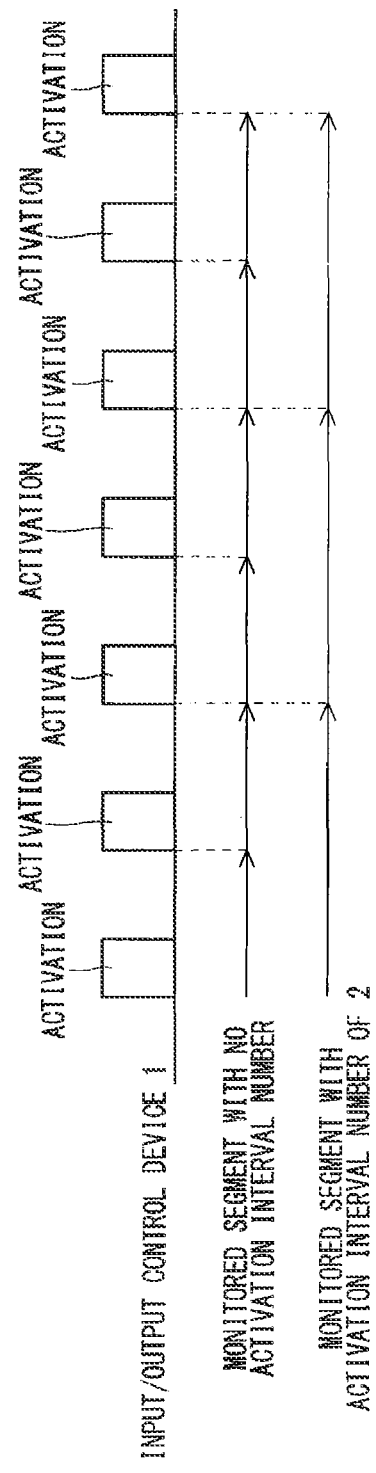
FIG. 13 is a timing chart for illustrating processing of the controller system according to the third embodiment.

FIG. 13 is a timing chart illustrating intervals for detecting activation interval anomaly in the controller system according to the third embodiment, and intervals for detecting activation interval anomaly in the controller system according to the second embodiment. Note that, although FIG. 13 illustrates the input/output control device 4-1, the same applies to the input/output control devices 4-2 and 4-3 as well.

A monitored segment with no activation interval number in FIG. 13 signifies, to be exact, a monitored segment with the activation interval number of 1, which corresponds to an interval for detecting activation interval anomaly according to the second embodiment. The interval for detecting activation interval anomaly according to the second embodiment corresponds to an interval with one activation of the one-shot timer 12.

A monitored segment with the activation interval number of 2 in FIG. 13 corresponds to an interval for detecting activation interval anomaly according to the third embodiment. The interval for detecting activation interval anomaly according to the third embodiment corresponds to an interval with two activations of the one-shot timer 12, i.e., each interval between the activation interval number of activations.

Figures 14, 15:
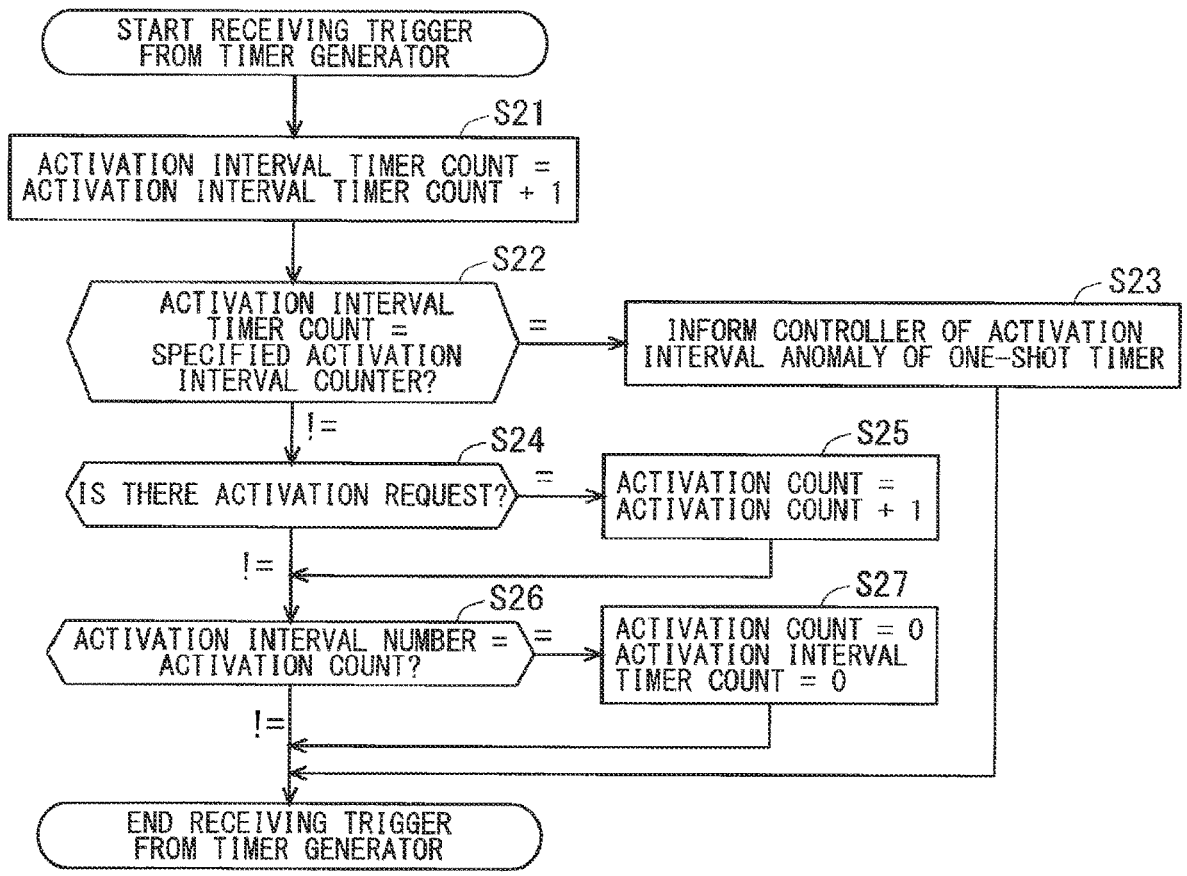
FIG. 14 is a flowchart illustrating processing of the input/output control device according to the third embodiment.
FIG. 15 is a diagram illustrating parameters stored in the one-shot timer control register according to a fourth embodiment.

FIG. 14 is a flowchart illustrating processing of detecting activation interval anomaly in the input/output control device 4 according to the third embodiment. Note that, the following description will be given supposing that a trigger of the timer generator 11 has been received and an interrupt handler has thereby been already activated.

First of all, in Step S21, an activation interval timer (not shown) of the input/output control device 4 increments the activation interval timer count.

In Step S22, the one-shot timer activation interval anomaly manager 16 determines whether or not the activation interval timer count matches with the specified activation interval counter. When determination is made that the activation interval timer count matches with the specified activation interval counter, the processing proceeds to Step S23, whereas when determination is made the activation interval timer count does not match with the specified activation interval counter, the processing proceeds to Step S24.

In Step S23, the one-shot timer activation interval anomaly manager 16 activates an activation interval anomaly interrupt of the one-shot timer to inform the controller 1 about activation interval anomaly. After that, the processing of FIG. 14 is ended.

When the processing proceeds from Step S22 to Step S24, the one-shot timer activation interval anomaly manager 16 determines whether or not to have acquired, from the controller 1, an activation request of the one-shot timer 12, such as the registered data in initialization 31. When determination is made that the one-shot timer activation interval anomaly manager 16 has acquired an activation request of the one-shot timer 12, the processing proceeds to Step S25, whereas when determination is made that the one-shot timer activation interval anomaly manager 16 has not acquired an activation request of the one-shot timer 12, the processing proceeds to Step S26.

In Step S25, the one-shot timer activation interval anomaly manager 16 increments the activation count. Then, the processing proceeds to Step S26.

In Step S26, the one-shot timer activation interval anomaly manager 16 determines whether or not the activation count matches with the activation interval number. When determination is made that the activation count matches with the activation interval number, the processing proceeds to Step S27, whereas when determination is made that the activation count does not match with the activation interval number, the processing of FIG. 14 is ended.

In Step S27, the one-shot timer activation interval anomaly manager 16 resets the activation count and the activation interval timer count into 0. After that, the processing of FIG. 14 is ended.

In the controller system according to the third embodiment as described above, the specified activation interval counter is, calculated based, on the connected-sensor total number, the activation interval number, and the unit conversion coefficient. Therefore, the effects similar to those of the second embodiment can be obtained. Further, when the activation interval number of activations of the one-shot timer 12 are not performed within the specified activation interval, activation interval anomaly can be detected.

Fourth Embodiment

The configuration of the input/output control device according to a fourth embodiment of the present invention is similar to the configuration of the input/output control device according to the second embodiment of FIG. 7. In the description below, components described in the fourth embodiment that are the same as or similar to the components of the third embodiment are denoted by the same reference symbols, and different components are mainly described.

The one-shot timer activation interval anomaly manager 16 according to the fourth embodiment has a first mode in which detection of activation interval anomaly is carried out starting from one activation of the one-shot timer 12, and a second mode in which detection of activation interval anomaly is carried out starting from the activation interval number of activations of the one-shot timer. Then, the one-shot timer activation interval anomaly manager 16 selectively executes the first mode and the second mode. The description hereinafter will be given referring to the first mode as an overlapping mode, and the second mode as a normal mode.

FIG. 15 is a diagram illustrating parameters stored in the one-shot timer control register 14 according to the fourth embodiment. The one-shot timer control register 14 according to the fourth embodiment stores an operation mode 26 along with the parameters of FIG. 11. The operation mode 26 indicates a control mode for monitoring activation intervals of the one-shot timer, among the normal mode and the overlapping mode. Here, such a configuration is adopted that the operation mode 26 of "0" may indicate the control mode of the normal mode, and the operation mode 26 of "1" may indicate the control mode of the overlapping mode.

Figure 16:
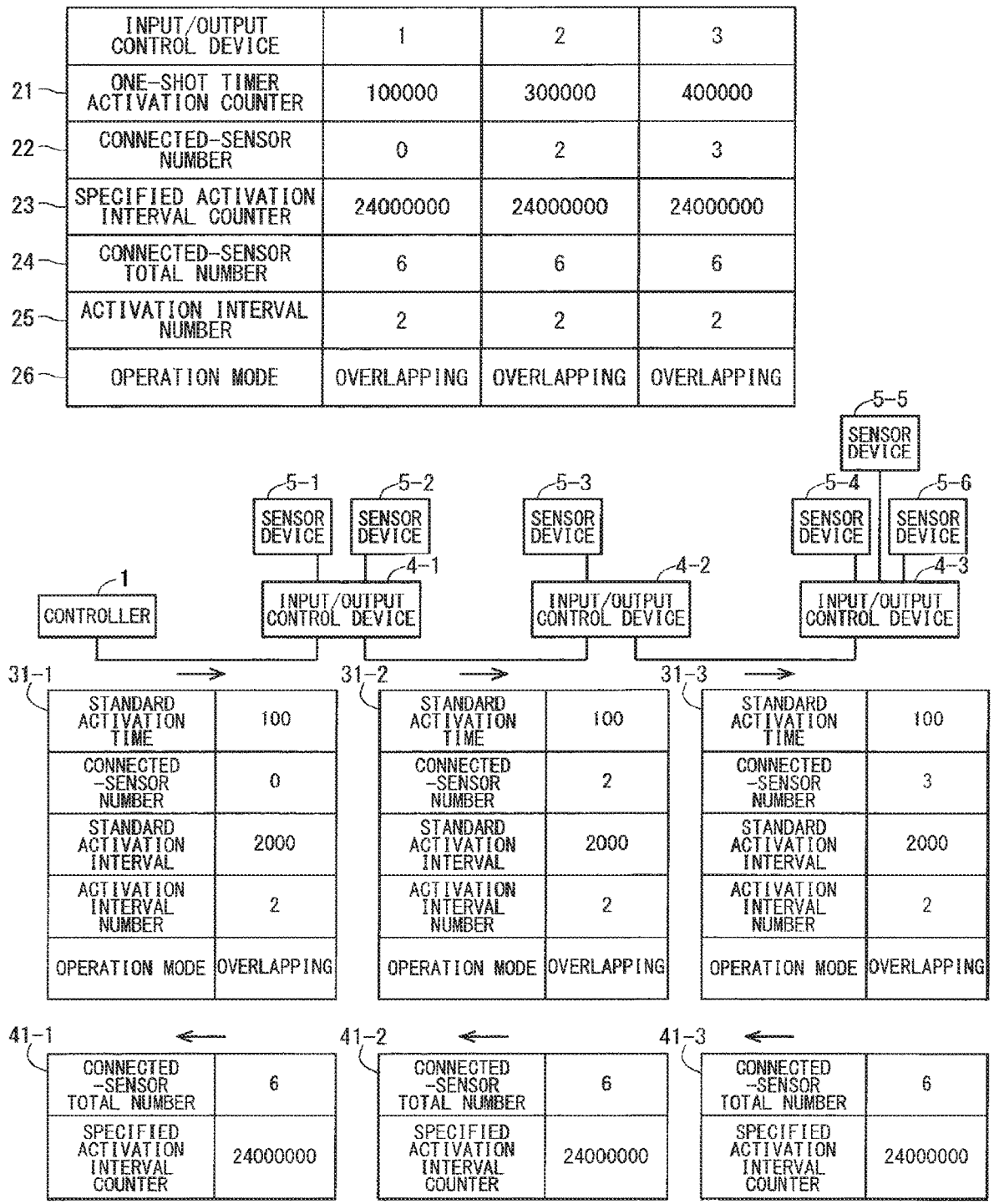
FIG. 16 is a diagram for illustrating processing of the controller system according to the fourth embodiment.

FIG. 16 is a diagram for illustrating processing of the controller system according to the fourth embodiment.

Similarly to the third embodiment, the controller 1 transmits the registered data in initialization 31-1 to the input/output control device 4-1. Note that, the registered data in initialization 31-1 according to the fourth embodiment contains an operation mode along with the registered data in initialization 31-1 according to the third embodiment of FIG. 12. Similarly, the pieces of the registered data in initialization 31-2 and 31-3 according to the fourth embodiment each further contain an operation mode. Note that, in the example of FIG. 16, the operation mode of the pieces of the registered data in initialization 31-1 to 31-3 is the "overlapping mode." In this case, the registered data in initialization 31 from the controller 1 is sequentially transmitted to the input/output control devices 4-1, 4-2, and 4-3, thereby sequentially setting the "overlapping mode" in the one-shot timer control registers 14 of the input/output control devices 4-1, 4-2, and 4-3.

Figure 17:
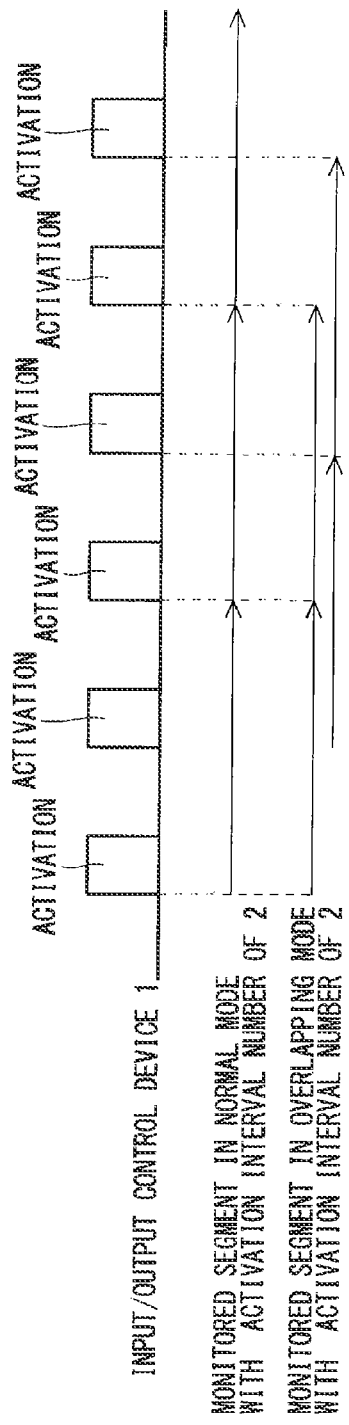
FIG. 17 is a timing chart for illustrating processing of the controller system according to the fourth embodiment.

FIG. 17 is a timing chart illustrating intervals for detecting activation interval anomaly in the controller system according to the fourth embodiment. Note that, although FIG. 17 illustrates the input/output control device 4-1, the same applies to the input/output control devices 4-2 and 4-3 as well. Further, here, the activation interval number is "2."

As illustrated in FIG. 17, a monitored segment in the normal mode with the activation interval number of 2 corresponds to an interval with two activations of the one-shot timer 12. In this manner, in the normal mode, starting from the same number as the activation interval number of activations of the one-shot timer 12, monitoring of the activation intervals is started to thereby detect activation interval anomaly.

As illustrated in FIG. 17, a monitored segment in the overlapping mode with the activation interval number of 2 corresponds to an interval with one activation of the one-shot timer 12. In this manner, in the overlapping mode, starting from one activation of the one-shot timer 12, monitoring of all of the activation intervals is started to thereby detect activation interval anomaly.

Figures 18, 19:
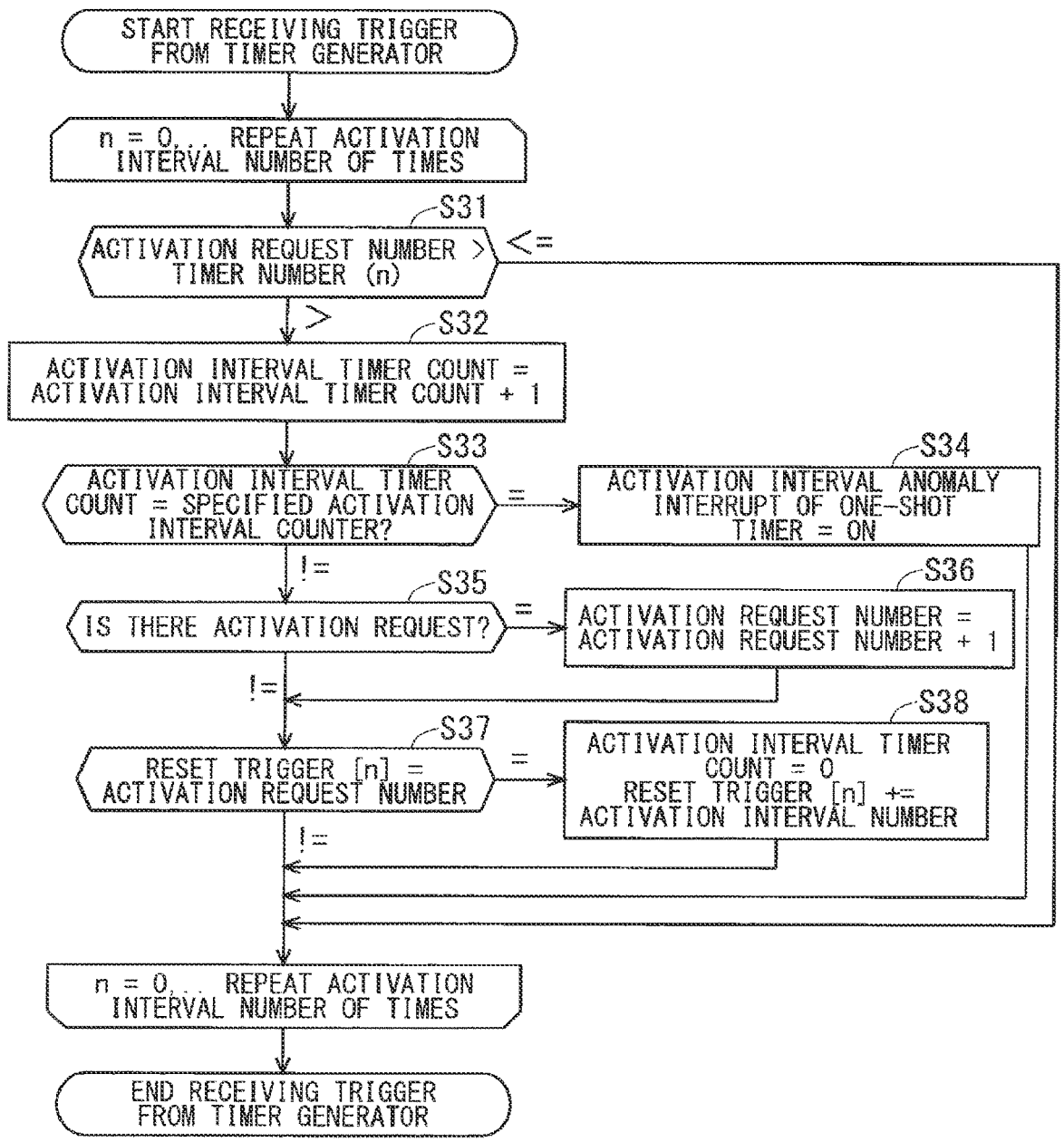
FIG. 18 is a diagram illustrating an overlapping mode activation interval management table according to the fourth embodiment.
FIG. 19 is a flowchart illustrating processing of the input/output control device according to the fourth embodiment.

FIG. 18 is a diagram illustrating an overlapping mode activation interval management table. The overlapping mode activation interval management table stores information for managing all of the activation intervals using the overlapping mode.

The table has the same number of records as the activation interval number. A timer number is a number indicating an ID of each record, and the numbers of 0, 1, 2, . . . are given in order. The activation interval timer count is counted up for monitoring activation intervals, but is reset in activation. A reset trigger is data for determining after how many times of activation requests the activation interval timer count is to be reset, and is a variable that is changeable as the processing proceeds. The specified activation interval counter is the same as that described above. An activation request number is the number of times an activation interval timer (not shown) provided in the input/output control device 4 is activated up to the present time point, and is a variable that is changeable as the processing proceeds.

FIG. 19 is a flowchart illustrating processing of detecting activation interval anomaly when the overlapping mode is applied in the input/output control device 4 according to the fourth embodiment. Note that, the following description will be given supposing that a trigger of the timer generator 11 has been received and an interrupt handler has thereby been already activated.

The flow of Steps S31 to S38 described below is repeatedly executed for the activation interval number of times, i.e., executed for the same number of times as the number of the timer numbers. Then, each time the flow of Steps S31 to S38 is repeated, the timer number compared in Step S31 is changed to be larger in order as in 0, 1, 2, . . . .

First of all, in Step S31, the input/output control device 4 determines whether or not the activation request number is larger than the timer number. When determination is made that the activation request number is larger than the timer number, the processing proceeds to Step S32, whereas when determination is made that the activation request number is equal to or less than the timer number, the processing of FIG. 19 is substantially ended. With this, only in a case where the activation request is received, the processing proceeds to Step S32 so that each timer detects anomaly.

In Step S32, an activation interval timer (not shown) of the input/output control device 4 increments the activation interval timer count.

In Step S33, the one-shot timer activation interval anomaly manager 16 determines whether or not the activation interval timer count matches with the specified activation interval counter. When determination is made that the activation interval timer count matches with the specified activation interval counter, the processing proceeds to Step S34, whereas when determination is made that the activation interval timer count does not match with the specified activation interval counter, the processing proceeds to Step S35.

In Step S34, the one-shot timer activation interval anomaly manager 16 activates an activation interval anomaly interrupt of the one-shot timer to inform the controller 1 about activation interval anomaly. After that, when the number of times the flow of Steps S31 to S38 is repeated does not reach the activation interval number, the processing returns to Step S31, whereas when the number of times the flow of Steps S31 to S38 is repeated reaches the activation interval number, the processing of FIG. 19 is ended.

When the processing proceeds from Step S33 to Step S35, the one-shot timer activation interval anomaly manager 16 determines whether or not to have acquired, from the controller 1, an activation request of the one-shot timer 12, such as the registered data in initialization 31. When determination is made that the one-shot timer activation interval anomaly manager 16 has acquired an activation request of the one-shot timer 12, the processing proceeds to Step S36, whereas when determination is made that the one-shot timer activation interval anomaly manager 16 has not acquired an activation request of the one-shot timer 12, the processing proceeds to Step S37.

In Step S36, the one-shot timer activation interval anomaly manager 16 increments the activation request number. Then, the processing proceeds to Step S37.

In Step S37, the one-shot timer activation interval anomaly manager 16 determines whether or not the activation request number matches with the reset trigger. When determination is made that the activation request number matches with the reset trigger, the processing proceeds to Step S38. When determination is made that the activation request number does not match with the reset trigger, the processing returns to Step S31 on condition that the number of times the flow of Steps S31 to S38 is repeated does not reach the activation interval number, whereas the processing of FIG. 19 is ended on condition that the number of times the flow of Steps S31 to S38 is repeated reaches the activation interval number.

In Step S38, the one-shot timer activation interval anomaly manager 16 resets the activation interval timer count into 0, and adds the activation interval number to the reset trigger. After that, when the number of times the flow of Steps S31 to S38 is repeated does not reach the activation interval number, the processing returns to Step S31, whereas when the number of times the flow of Steps S31 to S38 is repeated reaches the activation interval number, the processing of FIG. 19 is ended.

In the controller system according to the fourth embodiment as described above, the overlapping mode in which detection of activation interval anomaly can be carried out for each activation of the one-shot timer 12, and the normal mode in which detection of activation interval anomaly can be carried out for each activation interval number of activations of the one-shot timer 12 are selectively executed. With this, power consumption in a circuit can be reduced as needed.

Fifth Embodiment

Figure 20:
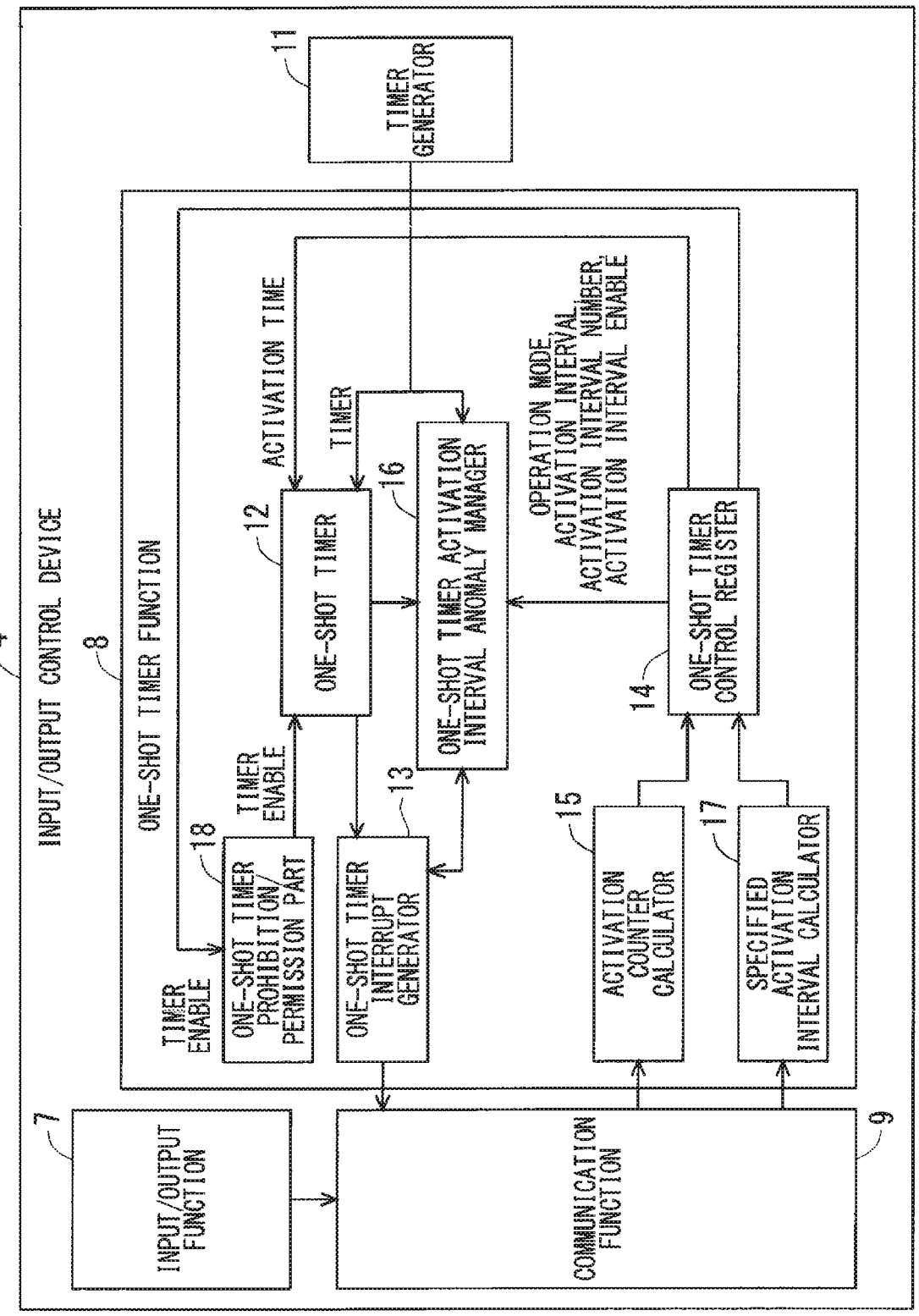
FIG. 20 is a block diagram illustrating a configuration of the input/output control device according to a fifth embodiment.

FIG. 20 is a block diagram illustrating a configuration of the input/output control device according to a fifth embodiment of the present invention. In the description below, components described in the fifth embodiment that are the same as or similar to the components of the fourth embodiment are denoted by the same reference symbols, and different components are mainly described.

The one-shot timer function 8 of FIG. 20 includes a one-shot timer prohibition/permission part 18 along with the one-shot timer function 8 according to the second embodiment of FIG. 7.

In the fifth embodiment, the one-shot timer 12 increments the one-shot timer count. Then, the one-shot timer prohibition/permission part 18 controls permission and prohibition of the increment of the one-shot timer count by controlling activation and suspension of the one-shot timer 12. Note that, this example is not restrictive, and the one-shot timer prohibition/permission part 18 may control permission and prohibition of the decrement of the one-shot timer count by controlling activation and suspension of the one-shot timer 12 when the one-shot timer 12 performs decrement.

Further, the input/output control device 4 according to the fifth embodiment prohibits detection of activation interval anomaly when all of the sensor devices 5 connected with the subject device are not objects to activate the one-shot timer 12.

FIG. 21 is a diagram illustrating parameters stored in the one-shot timer control register 14 according to the fifth embodiment. The one-shot timer control register 14 according to the fifth embodiment stores a timer enable 27 along with the parameters of FIG. 15. The timer enable 27 indicates permission and prohibition of a count-up, i.e., increment, of the one-shot timer 12 in each sensor device 5. Here, the timer enable 27 of "0" indicates prohibition of activation and increment of the one-shot timer 12, and the timer enable 27 of "1" indicates permission of activation and increment of the one-shot timer 12.

Figure 22:
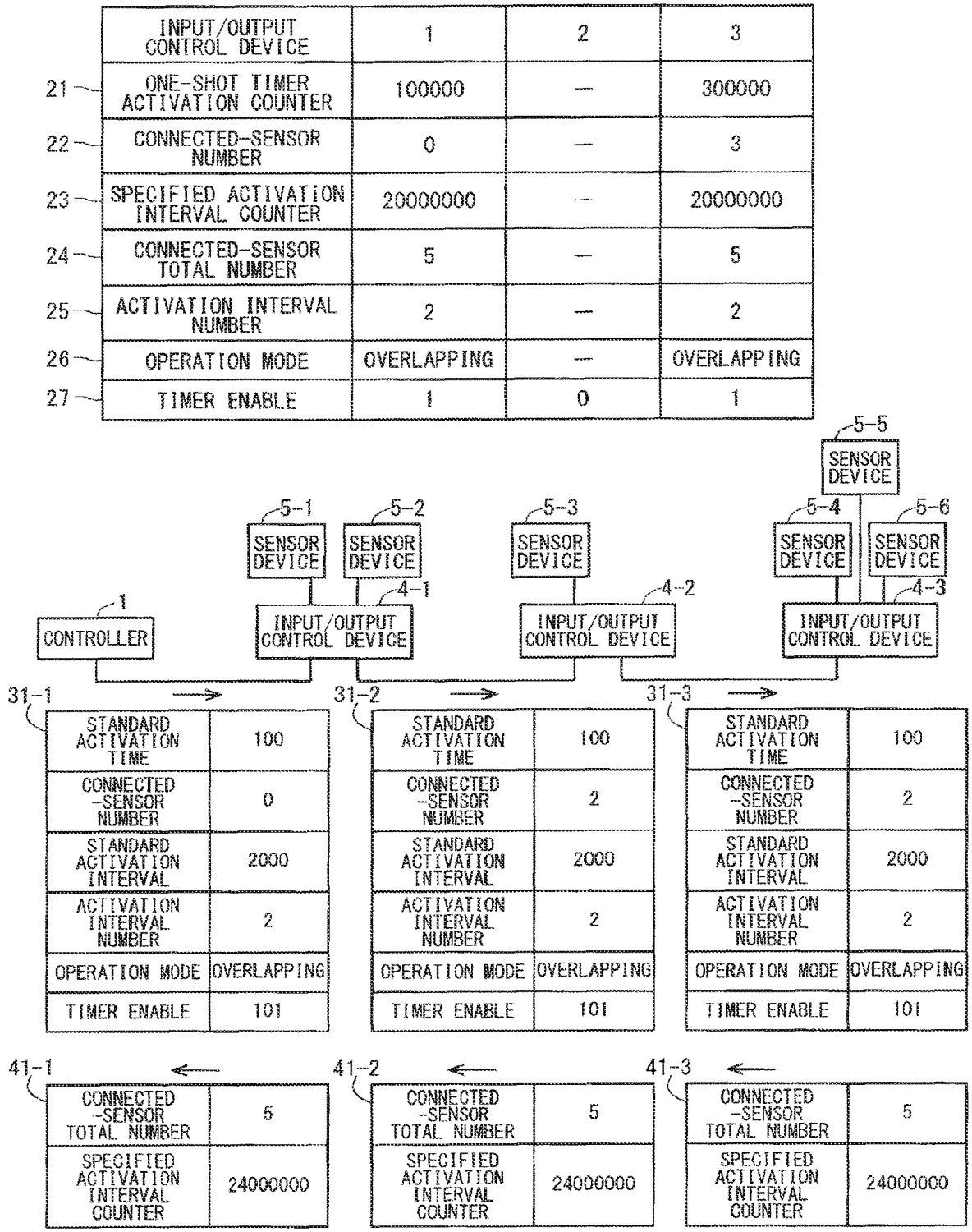
FIG. 22 is a diagram for illustrating processing of the controller system according to the fifth embodiment.

FIG. 22 is a diagram for illustrating processing of the controller system according to the fifth embodiment.

Similarly to the fourth embodiment, the controller 1 transmits the registered data in initialization 31-1 to the input/output control device 4-1. Note that, the registered data in initialization 31-1 according to the fifth embodiment contains a timer enable along with the registered data in initialization 31-1 according to the fourth embodiment of FIG. 16. Similarly, the pieces of the registered data in initialization 31-2 and 31-3 according to the fifth embodiment each further contain a timer enable. Note that, in the example of FIG. 22, the timer enable of the registered data in initialization 31-1 to 31-3 is 3-bit "101" in which "1" indicating permission of activation of the one-shot timer 12 of the input/output control device 4-1, "0" indicating prohibition of activation of the one-shot timer 12 of the input/output control device 4-2, and "1" indicating permission of activation of the one-shot timer 12 of the input/output control device 4-3 are arrayed.

In this case, when the registered data in initialization 31-1 is transmitted from the controller 1 to the input/output control device 4-1, the input/output control device 4-1 stores "1" of the timer enable and "0" of the connected-sensor number of the received registered data in initialization 31-1 in the one-shot timer control register 14 of the subject device. Then, the input/output control device 4-1 transmits registered data in initialization 31-2 to the input/output control device 4-2. Note that, the sensor devices 5-1 and 5-2 connected with the input/output control device 4-1 are objects to activate the one-shot timer 12, that is, the sensor devices 5-1 and 5-2 connected with the input/output control device 4-1 are counted by the one-shot timer 12. Therefore, the connected-sensor number of the registered data in initialization 31-2 is "2," which is obtained by adding "2" of the sensor devices 5-1 and 5-2 to "0" of the connected-sensor number of the registered data in initialization 31-1.

When the registered data in initialization 31-2 is transmitted from the input/output control device 4-1 to the input/output control device 4-2, the input/output control device 4-2 stores "0" of the timer enable of the received registered data in initialization 31-2 in the one-shot timer control register 14 of the subject device. Then, the input/output control device 4-2 transmits registered data in initialization 31-3 to the input/output control device 4-3. Note that, because the timer enable of the input/output control device 4-2 is "0," the sensor device 5-3 connected with the input/output control device 4-2 is not an object to activate the one-shot timer 12. Therefore, the connected-sensor number of the registered data in initialization 31-3 remains as "2" of the connected-sensor number of the registered data in initialization 31-2, without addition of "1" of the sensor device 5-3.

When the registered data in initialization 31-3 is transmitted from the input/output control device 4-2 to the input/output control device 4-3, the input/output control device 4-3 stores "1" of the timer enable and "2" of the connected-sensor number of the received registered data in initialization 31-3 in the one-shot timer control register 14 of the subject device. Further, because the input/output control device 4-3 is a terminal device, the input/output control device 4-3 stores "5" as the connected-sensor total number, which is obtained by adding "3" of the sensor devices 5-4, 5-5, and 5-6 connected with the subject device to "2" of the connected-sensor number of the received registered data in initialization 31-3, in the one-shot timer control register 14 of the subject device. The connected-sensor total number is, as described in the second embodiment, transmitted as the return data in initialization 41.

FIG. 23 is a timing chart illustrating the timing of transmitting sensor data to the controller 1 through a one-shot timer interrupt in the controller system according to the fifth embodiment. Note that, the initializations of FIG. 23 that are not illustrated in FIG. 5 correspond to pieces of return data in initialization of FIG. 22.

In the fifth embodiment, the one-shot timer 12 is not activated for the sensor device 5-3 of the input/output control device 4-2. Therefore, the sensor data of the sensor device 5-3 is not transmitted from the input/output control device 4-2 via the input/output control device 4-1 to the controller 1.

FIG. 24 is a flowchart illustrating processing of generating a one-shot timer interrupt in the input/output control device 4 according to the fifth embodiment. The processing of this flowchart is executed when a trigger is generated in the timer generator 11, i.e., when a trigger is received. Note that, the processing of FIG. 24 is obtained by adding Step S41 and changing Step S5 into Step S42 in the processing of FIG. 6. Therefore, in the processing of FIG. 24, description of the processing other than Steps S41 and S42 will be omitted appropriately.

First of all, in Step S41, the one-shot timer prohibition/permission part 18 determines whether or not the timer enable is "1," i.e., whether or not activation and increment of the one-shot timer 12 are permitted. When determination is made that the timer enable is "1," the processing proceeds to Step S1, whereas when determination is made that the timer enable is "0," the processing of FIG. 24 is ended.

In Step S4 proceeded from Step S1 through Steps S2 and S3, when determination is made that the one-shot timer count is equal to the one-shot timer activation counter, the processing proceeds to Step S42.

In Step S42, the one-shot timer interrupt generator 13 brings the one-shot timer interrupt into an on state, and generates a one-shot timer interrupt. Further, the input/output control device 4 suspends the activation of the one-shot timer 12, and resets the one-shot timer count into 0. After that, the processing of FIG. 24 is ended.

Figure 25:
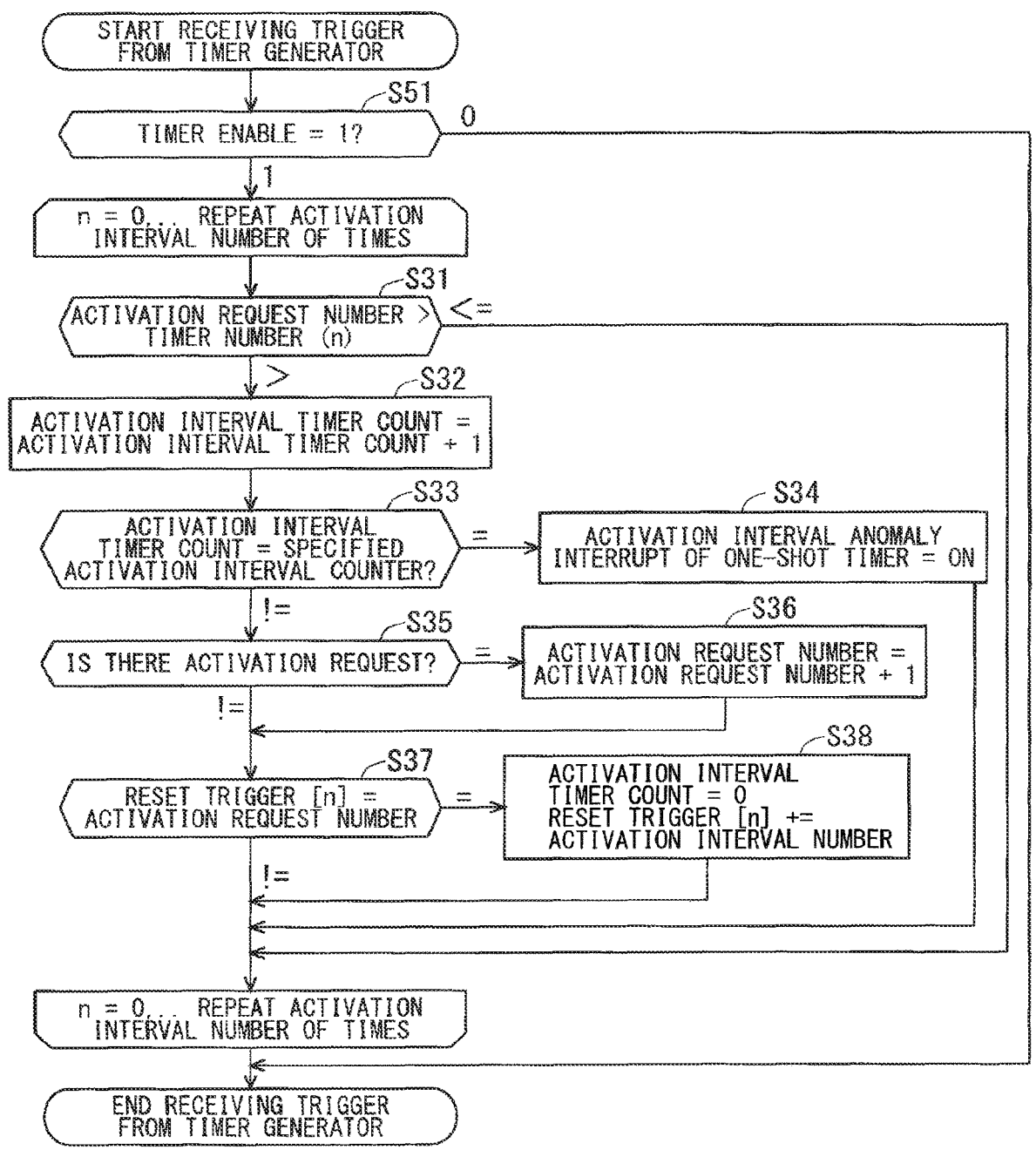
FIG. 25 is a flowchart illustrating processing of the input/output control device according to the fifth embodiment.

FIG. 25 is a flowchart illustrating processing of detecting activation interval anomaly in the input/output control device 4 according to the fifth embodiment. Note that, the processing of FIG. 25 is obtained by adding Step S51 in the processing of FIG. 19 of the fourth embodiment using the overlapping mode. Therefore, in the processing of FIG. 25, description of the processing other than Step S51 will be omitted appropriately.

First of all, in Step S51, the input/output control device 4 determines whether or not the timer enable is "1," i.e., whether or not activation and increment of the one-shot timer 12 are permitted. When determination is made that the timer enable is "1," the processing proceeds to Step S31 after a trigger of the timer generator 11 has been received and an interrupt handler has thereby been already activated. After that, the processing similar to that of the fourth embodiment of FIG. 19 is ended. On the other hand, when determination is made that the timer enable is "0," the processing of FIG. 25 is ended.

In the controller system according to the fifth embodiment described above, activation and suspension of each one-shot timer 12 are controlled. Therefore, the one-shot timer 12 of only a necessary input/output control device 4 can be activated. As a result, unnecessary sensor data need not be collected and transmitted, and therefore a load on the controller 1 can be reduced.

Further, in the controller system according to the fifth embodiment, detection of activation interval anomaly is prohibited when the one-shot timer 12 is not an object to be activated. As a result, unnecessary detection and transmission of activation interval anomaly need not be performed, and therefore a load on the controller 1 can be reduced.

Sixth Embodiment

The configuration of the input/output control device according to a sixth embodiment of the present invention is similar to the configuration of the input/output control device according to the fifth embodiment of FIG. 20. In the description below, components described in the sixth embodiment that are the same as or similar to the components of the fifth embodiment are denoted by the same reference symbols, and different components are mainly described.

The input/output control device 4 according to the sixth embodiment can control permission and prohibition of detection of activation interval anomaly when the sensor devices 5 connected with the subject device are objects to activate the one-shot timer 12.

FIG. 26 is a diagram illustrating parameters stored in the one-shot tier control register 14 according to the sixth embodiment. The one-shot timer control register 14 according to the sixth embodiment stores an activation interval enable 28 along with the parameters of FIG. 21. The activation interval enable 28 indicates permission and prohibition of detection of activation interval anomaly, i.e., informing and non-informing of activation interval anomaly to the controller 1. Here, the activation interval enable 28 of "0" indicates prohibition of detection of activation interval anomaly, and the activation interval enable 28 of "1" indicates permission of detection of activation interval anomaly.

Figure 27:
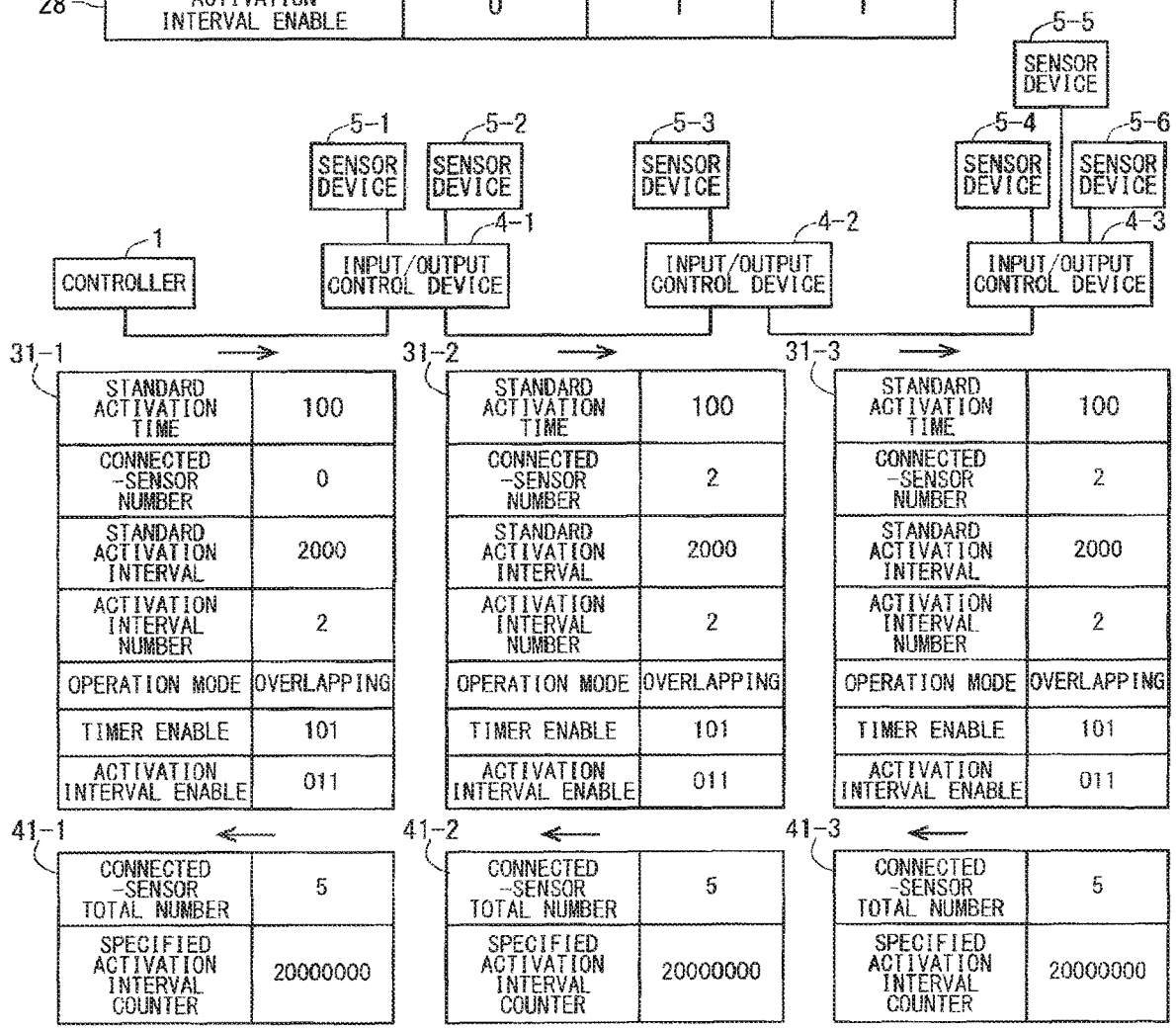
FIG. 27 is a diagram for illustrating processing of the controller system according to the sixth embodiment.

FIG. 27 is a diagram for illustrating processing of the controller system according to the sixth embodiment.

Similarly to the fifth embodiment, the controller 1 transmits the registered data in initialization 31-1 to the input/output control device 4-1. Note that, the registered data in initialization 31-1 according to the sixth embodiment contains an activation interval enable along with the registered data in initialization 31-1 according to the fifth embodiment of FIG. 22. Similarly, the pieces of the registered data in initialization 31-2 and 31-3 according to the sixth embodiment each further contain an activation interval enable. Note that, in the example of FIG. 27, the activation interval enable of the registered data in initialization 31-1 to 31-3 is 3-bit "011" in which "0" indicating prohibition of detection of activation interval anomaly of the input/output control device 4-1, "1" indicating permission of detection of activation interval anomaly of the input/output control device 4-2, and "1" indicating permission of detection of activation interval anomaly of the input/output control device 4-3 are arrayed.

In this case, the registered data in initialization 31 from the controller 1 is sequentially transmitted to the input/output control devices 4-1, 4-2, and 4-3, thereby setting "0" as the activation interval enable 28 in the one-shot timer control register 14 of the input/output control device 4-1, and setting "1" as the activation interval enable 28 in the one-shot timer control register 14 of the input/output control devices 4-2 and 4-3.

As a result, the input/output control device 4-1 is prohibited to detect activation interval anomaly by the activation interval enable, and thus does not detect activation interval anomaly. The input/output control device 4-2 is permitted to detect activation interval anomaly by the activation interval enable, but is prohibited to perform activation itself of the one-shot timer 12 by the timer enable. Thus, the input/output control device 4-2 does not detect activation interval anomaly. The input/output control device 4-3 is permitted to detect activation interval anomaly by the activation interval enable, and is also permitted to activate the one-shot timer 12 by the timer enable. Thus, the input/output control device 4-3 detects activation interval anomaly.

Figure 28:
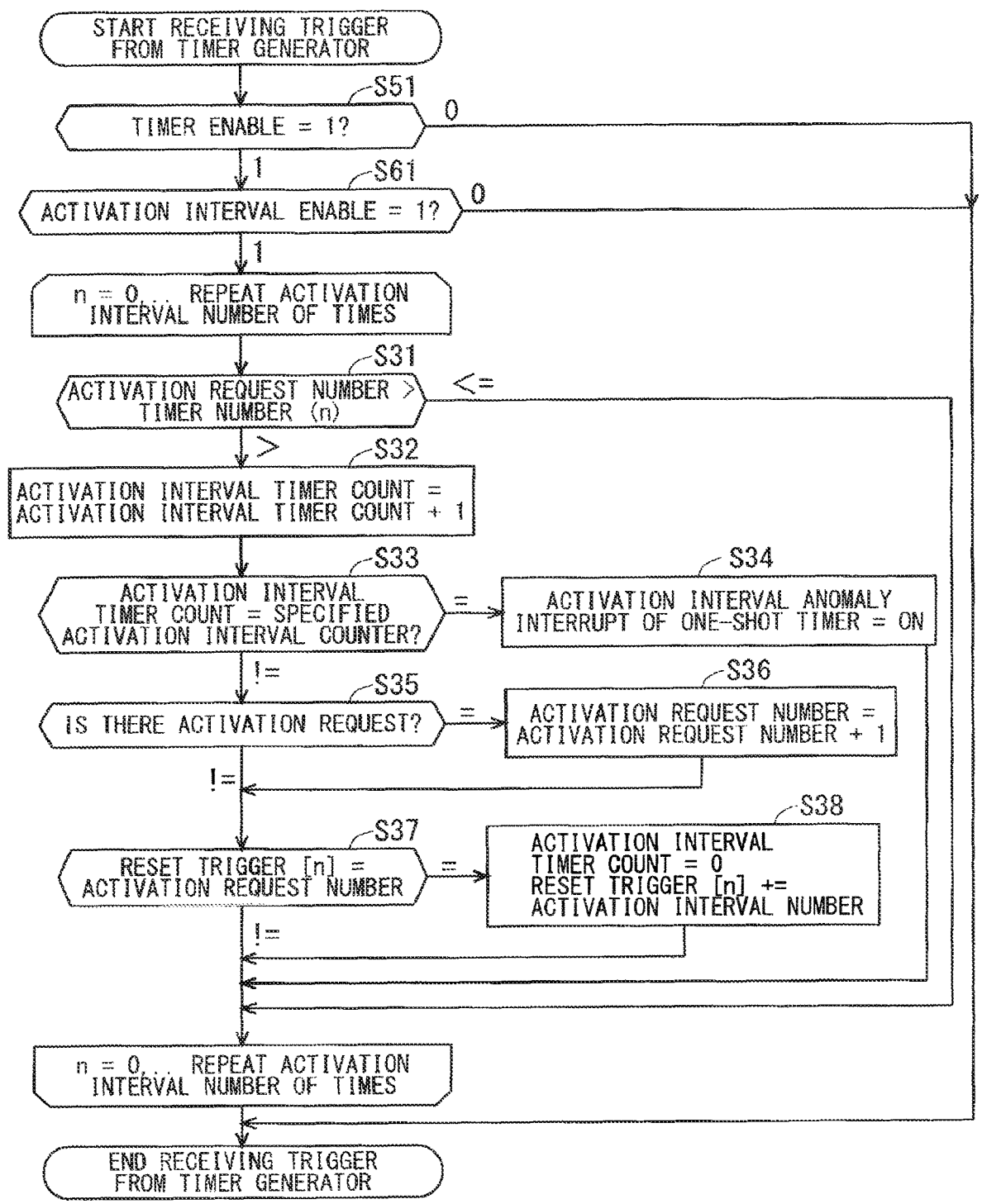
FIG. 28 is a flowchart illustrating processing of the input/output control device according to the sixth embodiment.

FIG. 28 is a flowchart illustrating processing of detecting activation interval anomaly in the input/output control device 4 according to the sixth embodiment. Note that, the processing of FIG. 28 is obtained by adding Steps S51 and S61 in the processing of FIG. 19 of the fourth embodiment using the overlapping mode. Therefore, in the processing of FIG. 28, description of the processing other than Steps S51 and S61 is omitted appropriately.

First of all, in Step S51, the input/output control device 4 determines whether or not the timer enable is "1," i.e., whether or not activation and increment of the one-shot timer 12 are permitted. When determination is made that the timer enable is "1," the processing proceeds to Step S61, whereas when determination is made that the timer enable is "0," the processing of FIG. 28 is ended.

In Step S61, the input/output control device 4 determines whether or not the activation interval enable is "1," i.e., whether or not detection of activation interval anomaly is permitted. When determination is made that the activation interval enable is "1," the processing proceeds to Step S31 after a trigger of the timer generator 11 has been received and an interrupt handler has thereby been already activated. After that, the processing similar to that of the fourth embodiment of FIG. 19 is ended. On the other hand, when determination is made that the activation interval enable is "0," the processing of FIG. 28 is ended.

In the controller system according to the sixth embodiment described above, even when the sensor device 5 is an object to activate the one-shot timer 12, activation interval anomaly of only a necessary input/output control device 4 can be detected because permission and prohibition of detection of activation interval anomaly is controlled. As a result, such effects that unnecessary detection and transmission of activation interval anomaly need not be performed can further be enhanced, and therefore a load on the controller 1 can be reduced.

Note that, in the present invention, each of the embodiments may be freely combined, and each of the embodiments may be modified or omitted in appropriate within the scope of the invention.

While the invention has been shown and described in detail, the foregoing description is in all aspects illustrative and not restrictive. It is therefore understood that numerous unillustrated modifications and variations can be devised without departing from the scope of the invention.

EXPLANATION OF REFERENCE SIGNS 1 controller, 4-1 to 4-3 input/output control device, 5-1 to 5-6 sensor device, 12 one-shot timer, 13 one-shot timer interrupt generator, 15 activation counter calculator, 16 one-shot timer activation interval anomaly manager, 17 specified activation interval calculator, 18 one-shot timer prohibition/permission part

The invention claimed is:

1. A controller system comprising:
a. controller; and
a plurality of input/output control devices connected in series with the controller so as to allow communication therebetween, each of the plurality of input/output control devices being able to be connected with a sensor device, wherein
each of the plurality of input/output control devices comprises:
processing circuitry configured to implement
a one-shot timer that regularly increments or decrements a one-shot timer count;
a one-shot timer interrupt generator that generates a one-shot timer interrupt based on the one-shot timer count and a one-shot timer activation counter; and
an activation counter calculator that calculates the one-shot timer activation counter of a subject input/output device based on a total number of the sensor devices being objects to activate the one-shot timer out of the sensor devices that are connected with another input/output control device between the subject input/output control device and the controller in series connection of the plurality of input/output control devices.

2. The controller system according to claim 1, wherein
the processing circuitry of each of the plurality of input/output control devices further implements a one-shot timer activation interval anomaly manager that detects whether or not an interval between activations of the one-shot timer is equal to or more than a specified activation interval counter, and informs the controller about activation interval anomaly when the interval is equal to or more than the specified activation interval counter, and
the processing circuitry of at least one of the plurality of input/output control devices further implements a specified activation interval calculator that calculates the specified activation interval counter based on a total number of the sensor devices being objects to activate the one-shot timer out of all of the sensor devices that are connected with the plurality of input/output control devices.

3. The controller system according to claim 1, wherein
the processing circuitry of each of the plurality of input/output control devices further implements a one-shot timer activation interval anomaly manager that detects whether or not a unit interval counter, whose unit is each interval between a predetermined plurality of times of activations of the one-shot timer, is equal to or more than a specified activation interval counter, and informs the controller about activation interval anomaly when the unit interval counter is equal to or more than the specified activation interval counter, and
the processing circuitry of at least one of the plurality of input/output control devices further implements a specified activation interval calculator that calculates the specified activation interval counter based on a total number of the sensor devices being objects to activate the one-shot timer out of all of the sensor devices that are connected with the plurality of input/output control devices, and also based on the predetermined plurality of times.

4. The controller system according to claim 3, wherein
the one-shot tinier activation interval anomaly manager selectively executes a first mode in which the detection is carried out starting from one activation of the one-shot timer, and a second mode in which the detection is carried out starting from the predetermined plurality of times of activations of the one-shot timer.

5. The controller system according to claim 1, wherein
the processing circuitry of each of the plurality of input/output control devices further implements a one-shot timer prohibition/permission part that controls permission and prohibition of increment or decrement of the one-shot timer count by controlling activation and suspension of the one-shot timer.

6. The controller system according to claim 2, wherein
the processing circuitry of each of the plurality of input/output control devices further implements a one-shot timer prohibition/permission part that controls permission and prohibition of increment or decrement of the one-shot timer count by controlling activation and suspension of the one-shot timer, and
the processing circuitry of each of the plurality of input/output control devices prohibits the detection when all of the sensor devices that are connected with the subject input/output control device are not objects to activate the one-shot timer.

7. The controller system according to claim 6, wherein
the processing circuitry of each of the plurality of input/output control devices can control permission and prohibition of the detection when the sensor device that is connected with the subject input/output control device is an object to activate the one-shot timer.

8. The controller system according to claim 1, wherein
at least one of the input/output control devices is simultaneously connected to a plurality of sensor devices.

9. The controller system according to claim 1, wherein
as the total number increases, the number of counts of the one-shot timer activation counter increases.

10. A method implemented by a controller system that includes a controller and a plurality of input/output control devices connected in series with the controller so as to allow communication therebetween, each of the plurality of input/output control devices being able to be connected with a sensor device, the method comprising:
each of the plurality of input/output control devices
regularly incrementing, by a one-shot timer, a one-shot timer count;
generating, by a one-shot timer interrupt generator, a one-shot timer interrupt based on the one-shot timer count and a one-shot timer activation counter; and
calculating, by an activation counter calculator, the one-shot timer activation counter of a subject input/output control device based on a total number of the sensor devices being objects to activate the one-shot timer out of the sensor devices that are connected with another input/output control device between the subject input/output control device and the controller in series connection of the plurality of input/output control devices.

\* \* \* \* \*